(12) United States Patent
Padmanabhan

(10) Patent No.: US 11,636,098 B2
(45) Date of Patent: *Apr. 25, 2023

(54) COMPUTERIZED IMPLEMENTATION FRAMEWORK TO ABSTRACT DATA OBJECT DEFINITIONS ACROSS MULTIPLE COMPUTING ENVIRONMENTS

(71) Applicant: Salesforce, Inc., San Francisco, CA (US)

(72) Inventor: Prithvi Krishnan Padmanabhan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/462,610

(22) Filed: Aug. 31, 2021

(65) Prior Publication Data
US 2021/0397604 A1 Dec. 23, 2021

Related U.S. Application Data

(63) Continuation of application No. 16/888,391, filed on May 29, 2020, now Pat. No. 11,126,618.

(51) Int. Cl.
| | | |
|---|---|---|
| *G06F 16/23* | (2019.01) | |
| *G06F 16/25* | (2019.01) | |
| *G06F 16/248* | (2019.01) | |
| *G06F 16/245* | (2019.01) | |
| *G06F 9/451* | (2018.01) | |

(52) U.S. Cl.
CPC .......... *G06F 16/2379* (2019.01); *G06F 9/451* (2018.02); *G06F 16/245* (2019.01); *G06F 16/248* (2019.01); *G06F 16/258* (2019.01)

(58) Field of Classification Search
CPC .. G06F 16/2379; G06F 16/245; G06F 16/258; G06F 16/248; G06F 9/451
USPC .......................................................... 707/703
See application file for complete search history.

(56) References Cited

U.S. PATENT DOCUMENTS 10,887,157 B1 * 1/2021 Fletcher .............. H04L 41/0622
10,985,970 B1 * 4/2021 Goyal ................. G06F 16/2477
(Continued)

*Primary Examiner* — Dung K Chau
(74) *Attorney, Agent, or Firm* — Holland & Hart LLP

(57) ABSTRACT

Methods, systems, and devices supporting a data model abstraction framework are described. Some platforms (e.g., a multi-tenant cloud computing platform) may manage data across a number of persistent systems (e.g., cloud platforms, data stores, packages, etc.). To efficiently manage data across such systems, a platform may implement a metadata-driven abstraction layer. The abstraction layer may support a number of interface objects and interface fields, which may operate as abstracted versions of persistent objects and persistent fields. External entities (e.g., users, triggers, customizations, packages, plugins, or any other entities) may interact with the interface objects, and the abstraction layer may automatically handle mappings from the interface objects to the persistent systems. By using the metadata-driven abstraction layer, the platform may resolve conflicts between the external entities and multiple underlying persistent systems. Additionally, the abstraction layer may dynamically adjust mappings to handle migrations or other updates across the persistent systems.

20 Claims, 11 Drawing Sheets

(56) References Cited

U.S. PATENT DOCUMENTS

2014/0181013 A1\* 6/2014 Micucci ................. H04L 63/08
  707/610
2015/0163206 A1\* 6/2015 McCarthy ............ H04L 63/104
  726/4
2017/0041296 A1\* 2/2017 Ford ....................... G06F 21/64
2020/0104402 A1\* 4/2020 Burnett .............. G06F 16/2477
2020/0342068 A1\* 10/2020 Cai ......................... G06F 30/20

\* cited by examiner

COMPUTERIZED IMPLEMENTATION FRAMEWORK TO ABSTRACT DATA OBJECT DEFINITIONS ACROSS MULTIPLE COMPUTING ENVIRONMENTS

CROSS REFERENCES

The present Application for Patent is a continuation of U.S. patent application Ser. No. 16/888,391 by Padmanabhan, entitled "COMPUTERIZED IMPLEMENTATION FRAMEWORK TO ABSTRACT DATA OBJECT DEFINITIONS ACROSS MULTIPLE COMPUTING ENVIRONMENTS," filed May 29, 2020, which is assigned to the assignee hereof and expressly incorporated by reference herein.

FIELD OF TECHNOLOGY

The present disclosure relates generally to database systems and data processing, and more specifically to a computerized implementation framework to abstract data object definitions across multiple computing environments.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a system may support multiple computing environments storing data according to different definitions. For example, a system may support multiple cloud platforms, data stores, packages, or other computing environments, where different computing environments may persist objects according to different data schemas. As such, to manage information across the computing environments, the system may implement a complex set of dependencies and connectors between the different computing environments, where the dependencies and connectors may be environment-specific. Accordingly, a change to one computing environment (e.g., updating a data schema, migrating an object, etc.) may break multiple dependencies and/or connectors with multiple other environments, potentially resulting in data loss, inefficient processes, broken process flows, broken tenant-specific customizations, or any combination thereof. Additionally, data for a single entity may be spread across multiple computing environments. However, accessing data for the entity in one environment may fail to recognize related information for the entity in another environment, limiting the effectiveness of the data management across the full system.

DETAILED DESCRIPTION

Figure 1:
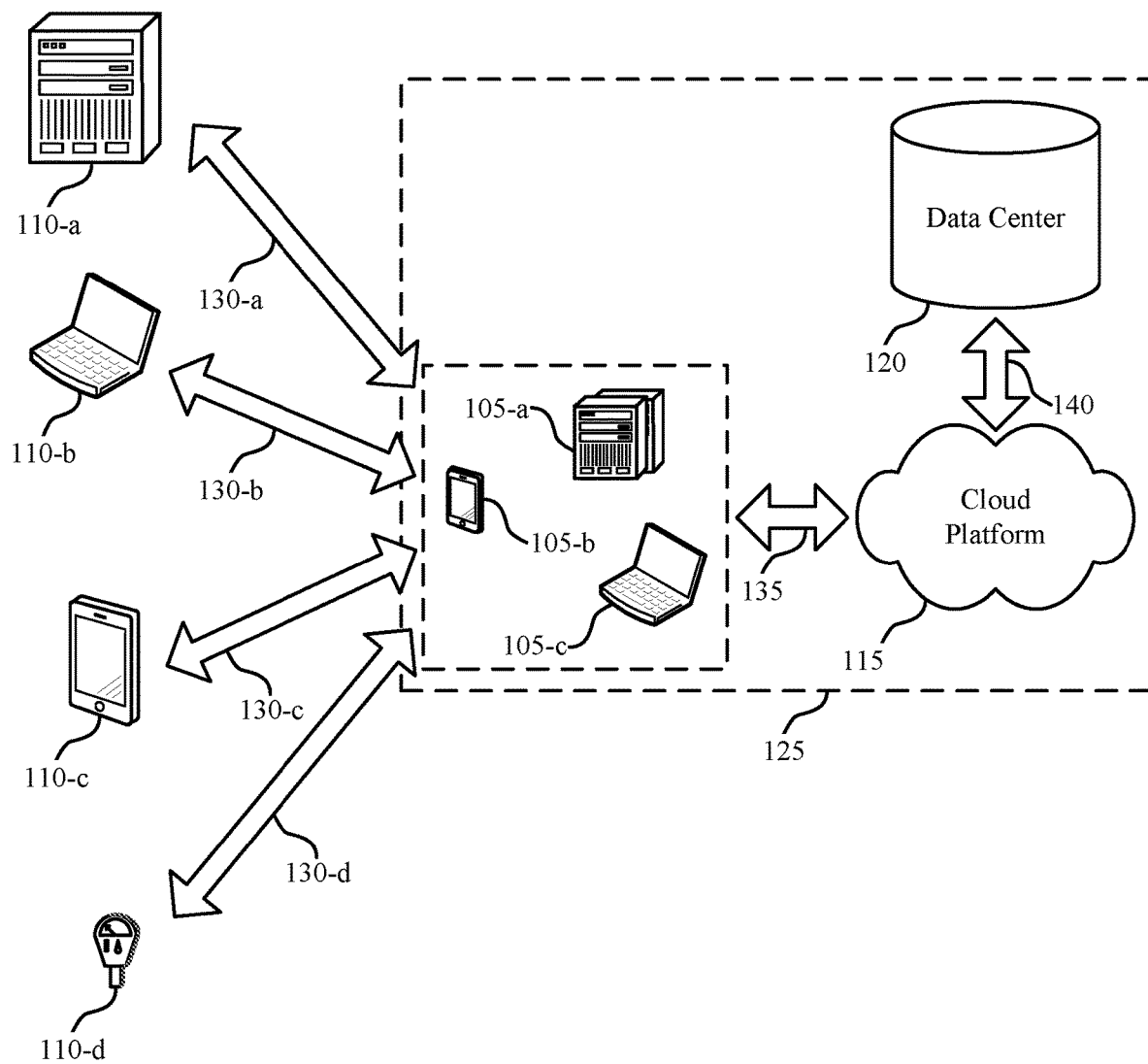
FIGS. 1 and 2 illustrate examples of systems that support computerized implementation frameworks to abstract data object definitions across multiple computing environments in accordance with aspects of the present disclosure.

In some cases, a system may support multiple computing environments storing data according to different definitions. For example, the system may support multiple cloud platforms, data stores, packages, or other computing environments (e.g., persistent systems), where different computing environments may persist objects according to different data schemas. For some systems, managing information across the computing environments may involve a complex set of dependencies and connectors between the different computing environments, where the dependencies and connectors may be environment-specific. Accordingly, a change to one computing environment (e.g., updating a data schema, migrating an object, etc.) may break multiple dependencies and/or connectors with other computing environments, potentially resulting in data loss, inefficient processes, broken process flows, broken tenant-specific customizations, or a combination thereof.

To manage data in a complex system involving multiple computing environments, a system may implement a computerized implementation framework to abstract data object definitions across the multiple computing environments. For example, the system (e.g., a multi-tenant cloud computing platform) may implement a metadata-driven abstraction layer to resolve conflicts between the computing environments and support access to the persisted objects. The abstraction layer may provide a number of interface objects and interface fields, which may operate as abstracted versions of persistent objects and persistent fields. An interface object may map to one or more data objects in one or more persistent systems, and an interface field may map to one or more data fields of one or more data objects. Additionally or alternatively, the abstraction layer may support transformations for values being mapped from an abstracted entity to a persisted entity (e.g., via one or more adaptors). External entities (e.g., users, triggers, customizations, packages, plugins, or any other entities) may interact with the interface objects, and the abstraction layer may automatically handle mappings from the interface objects to the persistent systems. By using the metadata-driven abstraction layer, the platform may dynamically determine mappings, automatically update to handle changes within persistent systems, and provide access to multiple computing environments in a transparent manner. For example, changes to an object in an underlying persistent system may not affect how packages interact with a corresponding interface object at the abstraction layer, such that the changes do not break the packages' dependencies.

The metadata defining the interface objects, interface fields, mappings, transformations, or any combination thereof may be configurable by a user. For example, an abstraction layer may be tenant-specific. In some cases, a software provider or some other entity may define a default abstraction layer for a multi-tenant cloud computing platform. A user associated with a tenant may customize the default abstraction layer to specifically support that tenant's systems, business flows, customizations, or any combination thereof. In some cases, the abstraction layer may dynamically determine information for a metadata entity. For example, the system may analyze metadata for an interface object and may infer a mapping or transformation based on metadata for persisted entities, mapping preferences, or both.

Aspects of the disclosure are initially described in the context of an environment supporting an on-demand database service. Additional aspects of the disclosure are described with reference to systems, mappings, querying processes, and process flows supporting an abstraction layer for multiple computing environments. Aspects of the disclosure are further illustrated by and described with reference to apparatus diagrams, system diagrams, and flowcharts that relate to a computerized implementation framework to abstract data object definitions across multiple computing environments.

FIG. 1 illustrates an example of a system 100 that supports a computerized implementation framework to abstract data object definitions across multiple computing environments in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some implementations, a system 100 (e.g., a multi-tenant cloud computing platform) may manage data across a number of persistent systems (e.g., cloud platforms, data stores, packages, or any other computing environments). To efficiently manage data across such computing environments, the system 100 may implement a metadata-driven abstraction layer. The abstraction layer may support a number of interface objects and interface fields, which may operate as abstracted versions of persistent objects and persistent fields. External entities (e.g., users, triggers, customizations, packages, plugins, or any other entities) may interact with the interface objects, and the abstraction layer may automatically handle mappings from the interface objects to the corresponding persistent objects. By using the metadata-driven abstraction layer, the platform may resolve conflicts between the external entities and the persistent entities, for examples, stored across multiple underlying persistent systems.

The abstraction layer may support a data model abstraction framework. The data model abstraction framework may manage mappings between abstracted entities and persistent entities. For example, for a cloud computing platform, a command center package may define the actual persistence of data objects stored for the cloud computing platform. The data model abstraction framework may define abstracted entities mapped to these persistent data objects, where software providers and other external entities may interact with the persistent data objects via the abstracted entities (e.g., using object descriptions, metadata, opinionated interfaces, or a combination thereof).

The data model abstraction framework may provide abstracted entities for any code-based entities, reducing package dependencies on persistent objects. For example, an object describe feature may provide the individual metadata for multiple levels of a specific interface object and an opinionated interface may support interactions with the interface object. An independent software vendor (ISV) may use the object describe, the opinionated interface, or both to access an interface object for use in one or more packages defined by the ISV. Additionally or alternatively, an ISV may use custom metadata to check mappings between the interface objects and underlying persistent objects. The packages may support scheduled tasks, code, components (e.g., page components), triggers calling abstracted code, action frameworks, or any combination thereof operating on the abstracted objects. By supporting interactions with the abstracted objects (e.g., rather than supporting interactions directly with persistent objects in persistent systems), the system 100 may reduce the complexity of dependencies and extensions between persistent systems, packages, or a combination thereof. For example, if an ISV deploys a package that queries or inserts objects or components in the persistent systems, using the abstracted objects may allow the ISV to refrain from creating an extension package (e.g., reducing the number of packages to install and, correspondingly, the complexity of the system 100).

In some cases, users, ISVs, or other entities may initially use metadata directly from a persistent system. In such cases, the system 100 or a developer may perform one or more migrations to update the calls to operate on abstracted entities (e.g., metadata in the abstraction layer) rather than on persistent entities (e.g., metadata in a computing environment). In some examples, the system 100 may implement a tool to analyze a tenant's customizations using the tenant's metadata and may perform a migration based on the analysis (e.g., migrating dependencies from core objects and custom objects to abstracted objects, reducing coupling with a command center package for a computing platform). In some cases, migration may be based on entity interfaces and corresponding mappings.

Other systems may implement dependencies directly on data objects stored in one or more persistent systems. However, if the persistence of a data object is modified, the dependencies may break. For example, if a custom object is moved to core for a cloud computing platform, calls to the custom object may fail. Accordingly, a user may have to update each package that calls the custom object to instead call the core object, causing significant latency for completing the object migration without causing errors in the system. Furthermore, if data corresponding to an entity is distributed across multiple persistent systems, a user querying for the data may fail to retrieve relevant information from one or more systems. Alternatively, for the query to retrieve holistic information, the user may write and perform multiple queries to multiple specific persistent systems in order to retrieve the information corresponding to the entity, significantly increasing the complexity involved in the querying process.

In contrast, the system 100 may automatically resolve mappings and queries across multiple persistent systems. By implementing the abstraction layer, the system 100 may reduce dependencies on specific persistent objects and systems and may instead handle the dependencies dynamically at the abstraction layer. As such, changes to how objects are stored in the persistent systems may not affect packages accessing the objects, because access to the abstracted objects may not change. Instead, the abstraction layer may dynamically update its mappings to map to the updated persistent objects and/or systems. Furthermore, the abstraction layer may transparently handle queries based on the mappings to persistent systems. As such, a user or ISV may define a single query for a single entity, and the abstraction layer may automatically determine how to query for the requested information across multiple persistent systems.

Using the abstraction layer, the system 100 may bridge the gaps between external entities (e.g., users, packages defined by ISVs, plugins, etc.) and persistent entities in one or more persistent systems (e.g., computing environments) corresponding to a multi-tenant cloud computing platform. The abstraction layer may be an example of an application or package that permits installation of other packages and/or plugins by mapping between objects to be installed and objects persistently stored in a computing environment (e.g., objects stored in a data center 120). Via a metadata-driven layer, the system 100 may resolve potential conflicts (e.g., in data schemas) such that packages and/or plugins may interact successfully with objects on the backend (or elsewhere). In this way, the abstraction layer may operate as a computerized framework to abstract resolution of different data object constructs to readily permit interaction between the data objects (e.g., data objects of different packages, different persistent systems, different plugins, etc.).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
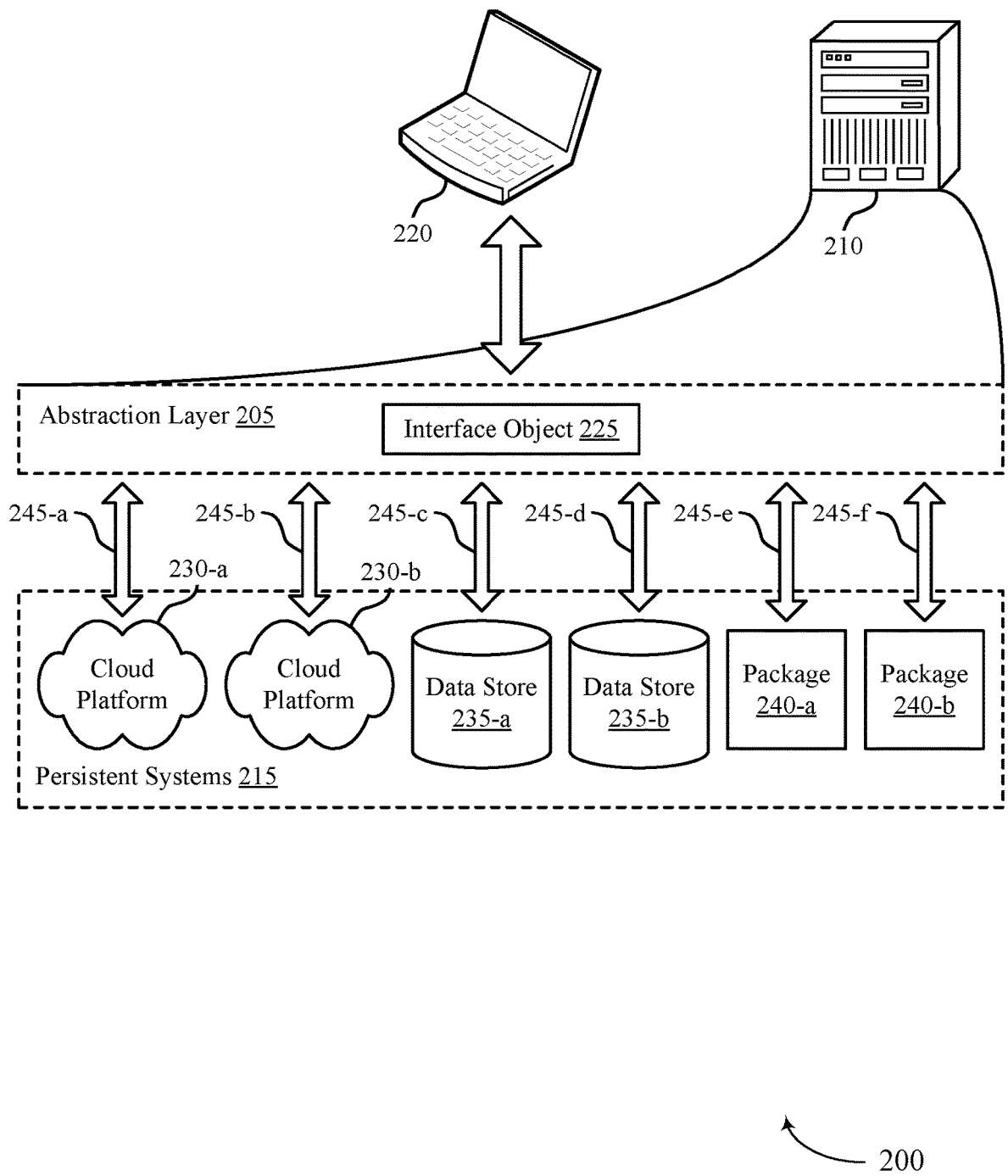

FIG. 2 illustrates an example of a system 200 that supports a computerized implementation framework to abstract data object definitions across multiple computing environments in accordance with aspects of the present disclosure. The system 200 may be an example of a system 100 as described with reference to FIG. 1. The system 200 may include an abstraction layer 205 supporting a data model abstraction framework that may run on a server 210, which may be an example of an application server, a database server, a cloud-based server, a server cluster, a virtual machine, a container, a worker, or any other device or system supporting a computerized implementation framework for abstraction. The abstraction layer 205 may abstract data object definitions across multiple persistent systems 215 (e.g., computing environments) using one or more interface objects 225. That is, the abstraction layer 205 may provide metadata-based support to abstract data out from one or more persistent systems 215 and provide an interface for interacting with the abstracted data.

In some examples, the abstraction layer 205 may be an example of a package (e.g., a set of metadata including one or more rules, object definitions, field definitions, or any other metadata-defined entities) installed for one or more tenants. For example, the abstraction layer 205 may be tenant-specific for a multi-tenant cloud computing platform or may be a default abstraction framework for multiple tenants running on the multi-tenant cloud computing platform. In some cases, each abstraction layer 205 may be associated with a specific tenant identifier. The package defining the abstraction layer 205 may be inter-dependent with one or more other packages, such as packages installed at the multi-tenant cloud computing platform, packages provided by software providers external to the multi-tenant cloud computing platform (e.g., ISVs), or the like. For example, the package defining the abstraction layer 205 may depend on a package 240 supporting a database-driven application, and the package 240 supporting the database-drive application may depend on the package defining the abstraction layer 205.

In some implementations, the abstraction layer 205 may manage dependencies between different persistent systems 215. For example, rather than package 240-a depending directly on package 240-b, the abstraction layer 205 may resolve this dependency such that packages 240-a and 240-b both depend on the abstraction layer 205 (e.g., rather than on one another). Accordingly, the system 200 may effectively reduce the number and complexity of dependencies between persistent systems 215 (e.g., cloud platforms 230, data stores 235, packages 240, or any combination of these or other persistent systems 215) by abstracting the objects in these persistent systems 215 up into the abstraction layer 205. Such an abstraction framework may significantly reduce installation errors, reduce the complexity of connections between persistent systems 215, simplify system maintenance, or support any combination of these improvements.

For example, persistent systems 215 may store data according to different data schemas (e.g., different data models, different persistence models, etc.). Specifically, different persistent systems 215 may use different constructs according to different computing environments for data storage. Additionally or alternatively, different persistent systems 215 may source data from different systems or processes. As such, a system 200 implementing multiple persistent systems 215 may manage data across a variety of system types, system architectures, data types, data models, or any combination thereof. However, managing such data may result in complex, case-specific solutions for handling interactions between persistent systems 215. Moreover, in some cases, duplicate data—or data stored as separate entities but actually corresponding to a same entity—may be stored across persistent systems 215 and the specific connections between persistent systems 215 may fail to detect and resolve such duplicate data. The abstraction layer 205 may provide a framework for abstracting entities across the persistent systems 215 in order to manage communication across systems and resolve conflicting or duplicate data across the systems.

The abstraction layer 205 may be an example of a computerized implementation framework that abstracts where and how data is stored and provides an interface for interacting with the data. In some examples, the computerized implementation framework may be referred to as a data model abstraction framework, a data model interface framework, or both. As such the computerized implementation framework may operate as a layer on one or more computing platforms (e.g., a virtual layer on a multi-tenant database system, a virtual layer on a deployed package, etc.). The abstraction layer 205 may support a user interface for interacting with underlying data stored in the computing platforms. For example, a user operating the user device 220 may interact with the user interface to create new data objects, update data objects, delete data objects, perform one or more functions on data objects, or perform any combination of these actions. The abstraction layer 205 may use one or more interface objects 225 as abstracted entities providing support for user interactions on the underlying data across the supported persistent systems 215. For example, the abstraction layer 205 may provide a mapping from an interface object 225 (e.g., a virtual, metadata-driven object) to one or more persisted data objects in one or more persistent systems 215. Such mappings may be user-defined, automatically inferred, or a combination thereof.

In some examples, a user operating the user device 220 may define at least a portion of the abstraction layer 205. For example, the system 200 may provide a setup user interface for specific types of users (e.g., administrative users). A user may define one or more interface objects, one or more interface fields, one or more mappings, one or more transformations, one or more interfaces for interacting with the interface objects, or a combination thereof using the setup user interface. These definitions may correspond to one or more metadata entities. The user may define one or more metadata entities programmatically, declaratively, or both. For example, the system 200 may generate an extensible markup language (XML) file or portion of a file, a JavaScript object notation (JSON) file or portion of a file, or any other metadata file or portion of a file based on the user inputs to the setup user interface. In some cases, the user may define information for a tenant-specific abstraction layer 205. For example, the user may be associated with a specific tenant of the multi-tenant cloud computing platform (e.g., based on the user's identifier) and may define abstraction information for that tenant.

In some examples, the multi-tenant cloud computing platform may implement a default abstraction layer 205 across tenants that may be configurable by a tenant. In this way, each tenant may implement either a default abstraction layer 205 or a tenant-specific customized abstraction layer 205 (e.g., based on one or more user-defined entities or tenant-specific process flows or customizations in the persistent systems 215). For example, a first party (e.g., an ISV or the multi-tenant cloud computing platform, etc.) may define an abstraction layer 205 and may set one or more configurability rules of the abstraction layer 205. A second party (e.g., a user associated with a specific tenant) may customize the abstraction layer 205 for the specific tenant (e.g., based on tenant-specific use cases, tenant-specific business processes, tenant-specific customizations, tenant-specific persistent systems 215 or architectures, or a combination thereof).

The abstraction layer 205 may include a number of connectors 245 to the different persistent systems 215 supported by the abstraction layer 205. For example, a single tenant can work across multiple cloud platforms 230, data stores 235, packages 240, or any combination of these or other persistent systems 215 (e.g., computing environments). The abstraction layer 205 may have separate connectors 245 to each of these persistent systems 215. A connector 245 may be an example of an adaptor or application programming interface (API), such as a representational state transfer (REST) API, a simple object access protocol (SOAP) API, a structured query language (SQL) adaptor, a package-specific or platform-specific adaptor, or any other type of adaptor or API. In some cases, each connector may be tenant-specific and/or may implement one or more security protocols for the secure transfer of information. As illustrated, the abstraction layer 205 may communicate with cloud platform 230-a via connector 245-a, cloud platform 230-b via connector 245-b, data store 235-a via connector 245-c, data store 235-b via connector 245-d, package 240-a via connector 245-e, and package 240-b via connector 245-f. It is to be understood that the abstraction layer 205 may communicate with any number of persistent systems 215 using any number or type of connectors 245.

By implementing the data model abstraction framework, the system 200 may support migration of data or changes to the data schema on the backend (or elsewhere) without affecting how users and other systems interact with the data in an interface. For example, the interface object 225 may operate as an abstraction of one or more physical objects, where the abstraction layer 205 may be similar to a materialized view and may be independent of where and/or how the physical objects are persisted in one or more persistent systems 215. Modifications to the physical objects may not affect how users, ISVs, and/or packaged code interact with the virtual objects (e.g., interface objects 225) in the abstraction layer 205. For example, a cloud computing platform may initially support a custom object. If the cloud computing platform migrates the custom object to core, the mapping from the interface object 225 may update to point to the object in core (e.g., rather than the outdated custom object). By updating the mapping, the system 200 may maintain the interface object 225 independent of whether the underlying persisted object is a custom object specific to a tenant or a core (e.g., standard) object across a set of tenants. As such, how the users, ISVs, and/or packaged code interact with the interface object 225 may remain unchanged despite the migration of the physical object, as the interface object 225 may map to a custom object, a core object, an external object, or any combination thereof transparent to entities interacting with the interface object 225.

Figure 3:
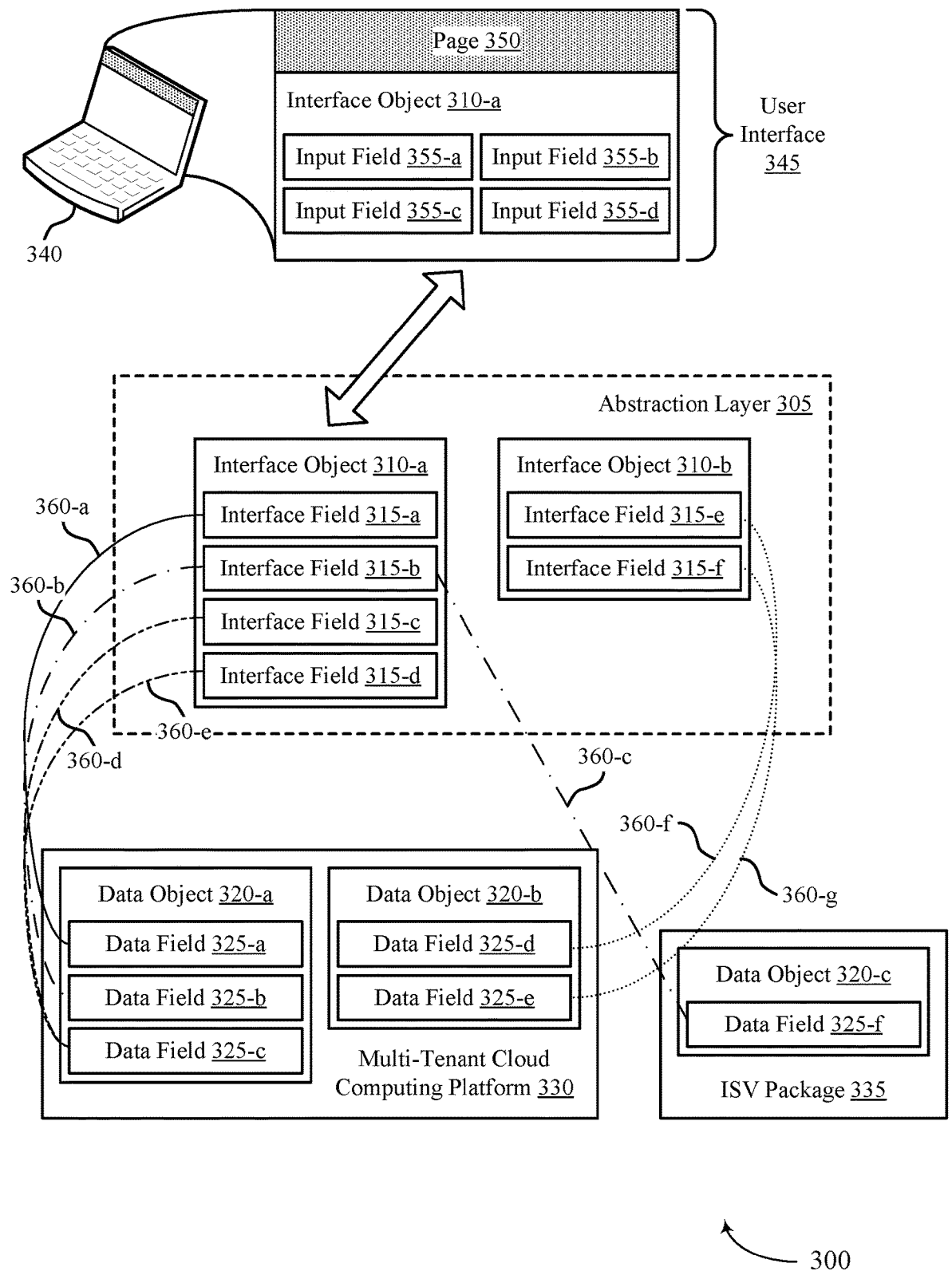
FIG. 3 illustrates an example of a mapping using an abstraction layer that supports a computerized implementation framework to abstract data object definitions across multiple computing environments in accordance with aspects of the present disclosure.

FIG. 3 illustrates an example of a mapping 300 using an abstraction layer 305 that supports a computerized implementation framework to abstract data object definitions across multiple computing environments in accordance with aspects of the present disclosure. The mapping 300 may be implemented by a system 100 or 200 as described with reference to FIGS. 1 and 2. The mapping 300 may be metadata-driven; for example, the abstraction layer 305 may operate as a metadata-based virtual layer on top of a metadata-based computing platform (e.g., a multi-tenant cloud computing system). The mapping 300 may define how one or more virtual objects (e.g., interface objects 310) map to one or more physical objects (e.g., data objects 320) persisted in one or more systems. For example, a system (e.g., a cloud computing system) may automatically perform data transformations and data mappings based on the mapping 300. The mapping 300 may be configured as metadata within a deployed package, automatically inferred based on metadata, determined on-the-fly during a mapping procedure, or any combination thereof.

An abstraction layer 305 (e.g., running on a computing device, such as a server 210 as described with reference to FIG. 2) may provide an interface and mappings for one or more interface objects 310. The abstraction layer 305 may send the interface supporting an interface object 310 to a user device 340 for display. In some cases, the user device 340 may display an interface for an interface object 310 in a user interface 345. The interface may be an example of a global interface or a custom interface and may be defined by a user, a developer, a package, or some combination thereof. In some examples, each interface object 310 may be associated with a specific page 350 for display (e.g., based on a page identifier, an object identifier, or a combination thereof). A user operating the user device 340 may interact with the interface object 310 rather than an underlying data object 320. In some cases, the mapping 300, the underlying data objects 320, or both may be transparent to the user at the user interface 345. For example, a user viewing interface object 310-a in the user interface 345 may believe that the user is interacting with data object 320-a on the backend. However, the user may actually be interacting with a different data object 320 or one or more additional data objects 320 on the backend (or elsewhere) based on the mapping 300.

In a specific example, the user may interact with an Employee object in the user interface 345. The user may select to access the Employee object for a cloud platform, but the abstraction layer 305 may map the interface Employee object such that the user interacts with an Employee object for an ISV. Additionally or alternatively, the mapping 300 for this interface Employee object may migrate from mapping to the Employee object in the ISV to the Employee object for the cloud platform transparent to the user interacting with the abstraction of this Employee object.

In some cases, a user (e.g., an administrative user) may define one or more portions of the abstraction layer 305. For example, the user may define an interface object 310, an interface field 315, a mapping 360, or any combination thereof. For example, the abstraction layer 305 may support a mapping interface including a visual representation of the mappings 360. In some cases, the mapping interface may show the connections between interface objects 310 and data objects 320, interface objects 310 and persistent systems, interface fields 315 and data fields 325, or any combination thereof. The user may programmatically or declaratively modify the mappings 360, create new mappings 360, delete mappings 360, or perform any combination of these actions. Additionally or alternatively, the user may add, update, or remove transformations involved in the mappings 360. For example, the abstraction layer 305 may implement any number of transformations when mapping from an interface field 315 to a data field 325 (or vice versa). These transformations may be defined by a software provider (e.g., an ISV), dynamically inferred based on metadata, defined by a user, or some combination thereof. In some cases, one or more adaptors supporting communication between the abstraction layer 305 and one or more persistent systems may perform the transformations on the communicated data.

The metadata supporting the abstraction layer 305 may define the interface, the mappings 360, and the transformations for each interface object 310. For example, for interface object 310-a, the metadata (e.g., user-defined metadata, ISV-defined metadata, or some combination thereof) may define how the interface for interface object 310-a is formatted for the page 350. The user interface 345 may display the page 350 for interface object 310-a, where the interface includes input field 355-a, input field 355-b, input field 355-c, and input field 355-d. These input fields 355 may correspond to interface fields 315. Using such fields, a user operating user device 340 may create new data objects 320, modify data fields 325, or both via interface object 310-a.

As a specific example, a metadata file (e.g., an XML file, a JSON file, or some other metadata file) may define a number of characteristics for an abstracted entity: an interface for a user to interact with the entity; an interface for one or more systems or packages to reference the entity; what abstracted object (e.g., interface object 310) corresponds to this entity; what abstracted fields does this object include (e.g., interface fields 315); to which data object(s) 320 does this abstracted object resolve; to which data field(s) 325 do the abstracted fields resolve; what transformations are performed for this object; or any combination thereof. A transformation may be an example of a simple, in-line transformation or a class to call in order to perform a transformation. A setup interface may support a user defining any of these characteristics.

The abstraction layer 305 may include metadata-defined mappings 360 and metadata-inferred mappings 360. The mappings 360 may include one-to-one mappings 360, one-to-many mappings 360, many-to-one mappings 360, many-to-many mappings 360, or any combination thereof. In some implementations, the abstraction layer 305 may support a first mapping between one or more interface objects 310 and one or more data objects 320 and may support a second mapping between one or more interface fields 315 and one or more data fields 325. The mappings may resolve potential conflicts between interface objects 310 defined at the abstraction layer 305 and data objects 320 defined at the persistent systems.

For example, as illustrated, one or more mappings 360 for the interface fields 315 of interface object 310-a may be defined in the metadata. Interface field 315-a may map to data field 325-a based on mapping 360-a. As such, at least a portion of interface object 310-a may map to data object 320-a persisted in a multi-tenant cloud computing platform 330. For example, for an Employee object, interface field 315-a may support an employee identifier that maps to an employee identifier data field 325-a. A user may input an employee identifier value into input field 355-a for interface field 315-a, and the abstraction layer 305 may automatically map this employee identifier value to data field 325-a (e.g., transparent to the user). Furthermore, any packages or processes that are database-driven may access and utilize the employee identifier stored in data field 325-a via interface field 315-a of interface object 310-a. As such, if the data schema, physical storage location or structure, persistence information, or any combination thereof changes for data object 320-a, the packages and processes using data object 320-a may not break, as these packages and processes may interact (e.g., transparently) with interface object 310-a as an abstraction of data object 320-a.

Similarly, interface field 315-b may map to data field 325-b of data object 320-a and data field 325-f of data object 320-c. As such, interface object 310-a may operate as an abstraction for multiple underlying data objects 320. Additionally, interface object 310 may operate as an abstraction on top of multiple persistent systems, including the multi-tenant cloud computing platform 330 and an ISV package 335. At least a portion of interface field 315-b may map to data field 325-b according to mapping 360-b and at least a portion of interface field 315-b may map to data field 325-f according to mapping 360-c. For example, interface field 315-b may support an Account associated with an Employee object. Some account information (e.g., the account name) may be stored in data field 325-b based on mapping 360-b and some account information (e.g., an account's revenue numbers) may be stored in data field 325-f based on mapping 360-c. Accordingly, data for a single entity (e.g., a single account) may be distributed across multiple persistent systems. However, using the abstraction layer 305 and the supported mappings 360, a system may resolve the distribution and any disparities in how the data is persisted in the separate systems. For example, if the abstraction layer 305 receives a query for account information related to an Employee object, the abstraction layer 305 may retrieve account information from both data object 320-a and data object 320-c in response to the query based on the mappings 360.

Interface field 315-c and interface field 315-d may both map to data field 325-c of data object 320-a. For example, for an Employee object, interface field 315-c may support an employee first name and interface field 315-d may support an employee last name. These two fields may map to an employee full name data field 325-c according to mapping 360-d and mapping 360-e. Additionally, the mappings 360-d and 360-e may involve a transformation (e.g., a String aggregation transformation) to combine the first name and the last name into a full name for the employee.

In some implementations, one or more mappings 360 for the interface fields 315 of interface object 310-b may be undefined in the metadata. For example, the set of metadata defining interface object 310-b for the abstraction layer 305 may not provide a mapping for interface field 315-e or interface field 315-f. Additionally or alternatively, an interface object 310 may include a combination of interface fields 315 with defined mappings 360 and interface fields 315 with undefined mappings 360. If an interface is provided without a mapping (e.g., interface object 310-b is defined in metadata without a mapping to a specific data object 320, interface field 315-e is defined in metadata without a mapping to a specific data field 325, etc.), the system may dynamically determine a mapping, for example, based on metadata information. By dynamically determining a mapping 360 if no mapping is defined, the system may automatically resolve an entity in the abstraction layer 305 to an entity at a persistent system.

In some examples, the system may perform a set of steps in order to identify a mapping for an interface object 310 and/or an interface field 315. For example, the system may check for a corresponding data object 320, data field 325, or both across a set of persistent systems using a preferred order of mapping. In some cases, a user may define a preference (e.g., for a tenant) for automatically mapping an interface entity to a data entity. As an example, the system may first check for a mapping to a cloud platform (e.g., first to a custom data object 320, then to a standard data object 320), such as the multi-tenant cloud computing platform 330, before checking for a mapping to an ISV package 335. However, any order of preference for mapping the interface entities may be supported. The system may additionally resolve conflicts. For example, if the system determines multiple potential mappings 360, the system may select one mapping 360 based on a mapping rule or may determine how to map between the multiple potential mappings 360 based on a mapping rule.

Because the mappings 360 are based on metadata, the system may dynamically determine or modify mappings 360 to handle dynamic systems, system updates, changes to data storage, or the like. For example, the system may analyze metadata for multiple persistent systems to determine how to abstract the data from these systems into interface objects 310. For example, based on data object 320-a and data object 320-c including metadata corresponding to an employee entity, the system may abstract both of these data objects 320-a and 320-c to an employee interface object 310-a. Similarly, the system may determine mappings 360 for interface object 310-b based on metadata defining interface object 310-b and metadata for the persistent systems. For example, based on an order for checking the persistent systems, the system may analyze the metadata for the data objects 320 persisted in the multi-tenant cloud computing platform 330 and may determine that the metadata for data object 320-b relates to the metadata for interface object 310-b. In some examples, the inferred mapping may be based on an object name, a field name, an object type, a field type, an object schema, or any combination of these or other metadata-defined characteristics of the entities. By analyzing the metadata, the abstraction layer 305 may map interface object 310-b to data object 320-b in the multi-tenant cloud computing platform 330. For example, interface field 315-e may map to data field 325-d according to inferred mapping 360-f and interface field 315-f may map to data field 325-e according to inferred mapping 360-g. The system may infer these mappings on-the-fly when interface object 310-b is defined or when an input value is received for interface field 315-e or interface field 315-f.

Additionally or alternatively, the system may automatically infer transformations based on the metadata. For example, the system may apply one or more transformations based on object types, field types, or both. Additionally or alternatively, the system may automatically determine an interface for an interface object 310 based on metadata. In an example, if a data field 325 includes a date field for an employee's birth date, but a corresponding interface field 315 includes an integer field for the employee's age, the system may automatically determine a transformation to apply in order to convert between a birth date value and an age value.

In some examples, the system may wrap multiple mappings 360 into a single transaction corresponding to a single commit. In this way, the system may refrain from performing the commit if any of the mappings 360 fail. However, if each mapping 360 is successful, the system may commit the changes to persistent storage across multiple data fields 325, data objects 320, and/or persistent systems. For example, if a user inputs a value for interface field 315-b, the abstraction layer may transform the value into two separate values and may map a first value to data field 325-b and a second value to data field 325-f. The abstraction layer 305 may perform a first pseudo-commit in the multi-tenant cloud computing platform 330 to update the value of data field 325-b and may perform a second pseudo-commit in the ISV package 335 to update the value of data field 325-f. However, the system may refrain from performing the full commit until both updates are complete, such that the commit for the transaction commits data to multiple persistent systems concurrently.

Figure 4:
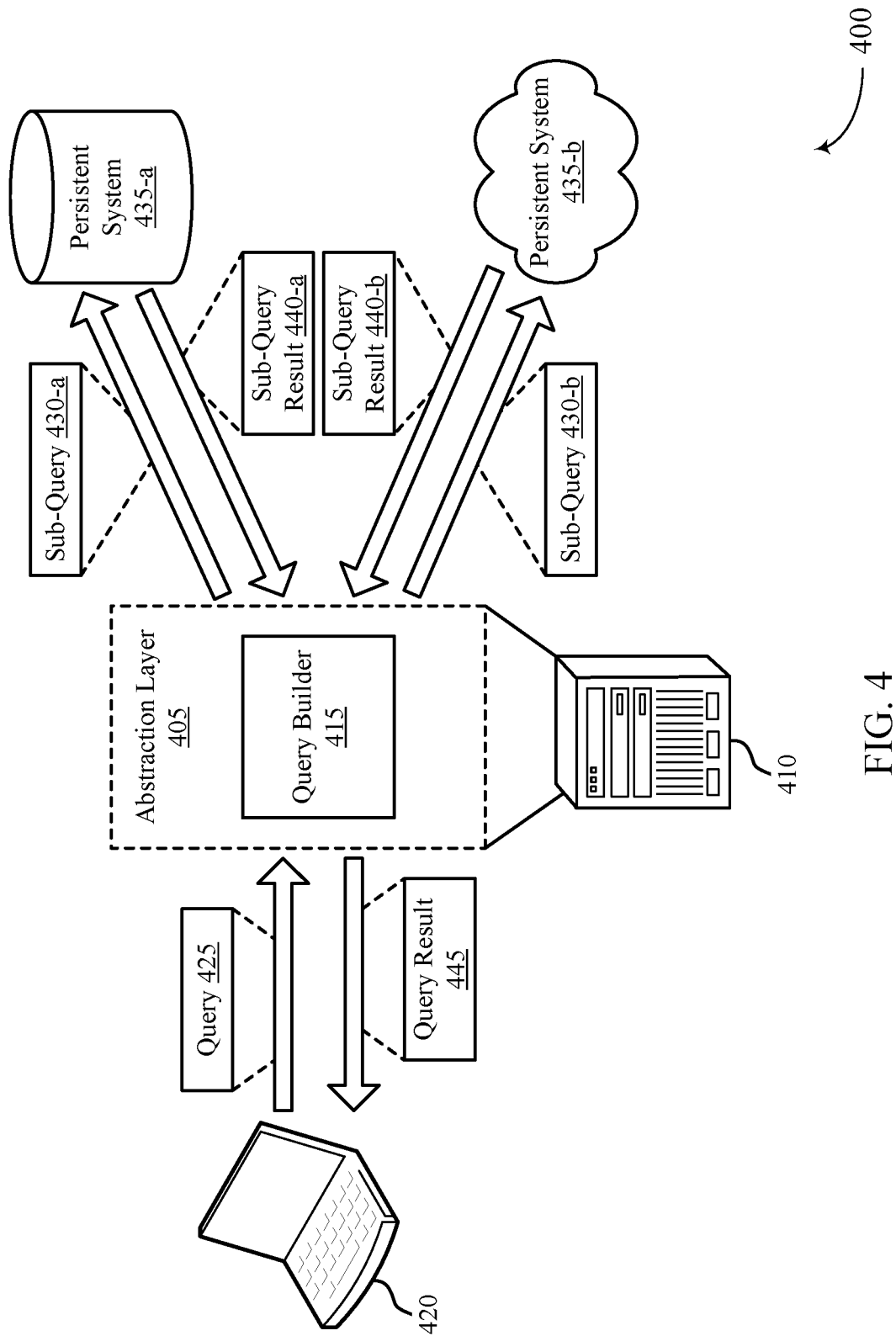
FIG. 4 illustrates an example of a query handling process that supports a computerized implementation framework to abstract data object definitions across multiple computing environments in accordance with aspects of the present disclosure.

FIG. 4 illustrates an example of a query handling process 400 that supports a computerized implementation framework to abstract data object definitions across multiple computing environments in accordance with aspects of the present disclosure. The query handling process 400 may manage queries for a system 100 or 200 as described with reference to FIGS. 1 and 2. For example, the query handling process 400 may leverage a mapping 300 to determine how to interpret and route queries at an abstraction layer 405 to one or more persistent systems 435. A server 410 may support the abstraction layer 405, which may be examples of the corresponding entities described with reference to FIGS. 2 and 3. In some cases, the abstraction layer 405 may implement a query builder 415 to manage queries for multiple persistent systems 435 (e.g., transparent to a querying entity).

A user device 420 or another system may send a query 425 to access data from one or more persistent systems 435. The query may be an example of a SQL query, a data object query, or any other type of query. In some cases, the abstraction layer 405 may intercept—or otherwise receive—the query 425 to determine how to handle the query based on the mappings defined at the abstraction layer 405. By managing the mappings at the abstraction layer 405, the system may allow a developer to define the query 425 independent of the mappings. Instead, the abstraction layer 405 may dynamically configure a received query 425 to function successfully across the underlying persistent systems 435.

The abstraction layer 405 may receive the query 425 and may analyze the query 425 (e.g., using the query builder 415). In some cases, analyzing the query 425 may involve parsing the query 425, performing natural language processing on the query 425, analyzing metadata for the query 425, or any combination thereof. Based on the query analysis, the abstraction layer 405 may determine how each query request and query parameter in the query 425 maps to physical entities (e.g., data objects, data fields, etc.) in the persistent systems 435. The abstraction layer 405 (e.g., using the query builder 415, which may be an example of a component implemented in hardware, software executed by a processor, firmware, or any combination thereof) may rewrite the query 425—or otherwise generate one or more new queries—based on the determined mapping. For example, the query builder 415 may rewrite a query to operate on a different persistent system 435 or multiple persistent systems 435 based on metadata, the mapping, or both. The abstraction layer 405 may route the one or more rewritten or generated queries to one or more persistent systems 435 based on the determined mapping.

As illustrated, the query 425 may request information for an object. The abstraction layer 405 may analyze the query 425 and determine that the object corresponds to an interface object that maps to multiple data objects. For example, the object may correspond to a first data object persisted at a first persistent system 435-a and a second data object persisted at a second persistent system 435-b. To accurately fulfill the query request, the abstraction layer 405 may generate a first sub-query 430-a to retrieve relevant information from persistent system 435-a and a second sub-query 430-b to retrieve relevant information from persistent system 435-b based on the mappings. The abstraction layer 405 may send the first sub-query 430-a to persistent system 435-a and may receive a first sub-query result 440-a in response. Additionally, the abstraction layer 405 may send the second sub-query 430-b to persistent system 435-b and may receive a second sub-query result 440-b in response. The abstraction layer 405 may send queries (e.g., sub-queries 430) to persistent systems 435 using one or more adaptors, such as SQL adaptors.

The abstraction layer 405 (e.g., using the query builder 415) may aggregate the first sub-query result 440-*a* and the second sub-query result 440-*b* to determine a query result 445 in response to the query 425. For example, the abstraction layer 405 may resolve received information corresponding to a first data object in persistent system 435-*a* and received information corresponding to a second data object in persistent system 435-*b* to a common interface object (e.g., an interface object corresponding to an object queried by the query 425). The abstraction layer 405 may generate the query result 445 message in a format based on the query 425 (e.g., to properly fulfill the query request). The abstraction layer 405 may transmit the query result 445 to a user device 420 or system in response to the query 425. The query result 445 may obfuscate the source(s) of the retrieved data, any transformation(s) performed on the retrieved data, or both, such that the abstraction layer 405 may handle the query 425 transparent to the querying user or system.

By handling traffic via the abstraction layer 405, the system may perform operations on abstracted objects and fields rather than persistent objects and fields. For example, the metadata for the abstracted objects and fields may supersede metadata for the persistent objects and fields (e.g., for standard objects, custom objects, etc.). As such, the system 405 may perform triggers and customizations on the abstracted entities (rather than the persisted entities), allowing these triggers and customizations to be more robust to modifications in the underlying systems and to dynamically handle new packages, updates, and the like (e.g., by using the metadata-defined abstracted entities and mappings). In some cases, to implement the abstracted layer 405, a system may perform one or more migrations in order to reconfigure calls to persistent entities to instead call abstracted entities. Via the abstraction layer 405, the system may handle any number of calls and queries 425, including insert queries, update queries, retrieval queries, or any other types of queries. The abstraction layer 405 may automatically handle running these queries across a set of persistent systems 435, significantly reducing the complexity, processing, and latency involved in querying separate persistent systems 435 for related data.

As described herein, an abstraction layer may support interfaces, objects, fields and mappings using metadata. In a specific example, the abstraction layer may implement custom metadata data types that define the mappings between one or more interface objects and one or more data objects. For example, the abstraction layer may support an entity class, an entity interface class, and an entity interface implementation. In some cases, an entity interface implementation may use custom metadata to determine a mapping to an actual entity (e.g., a persisted data object). If no mapping is found, the entity interface implementation may dynamically determine a mapping based on system metadata. For example, the entity interface implementation may use describe methods to evaluate metadata for a persistent system, a data object, a data field, or a combination thereof. In some cases, a mapping may not be exact or the system may fail to dynamically determine a mapping for one or more values. In some such cases, the system may use a "MyEntityFieldMapping" to handle such fields or other fields in special implementations.

The query builder 415, as described with reference to FIG. 4, may be a builder pattern to support queries. The query builder 415 may receive a query, analyze the query, and generate corresponding code to create a query string for execution. As a specific example, the query builder 415 may receive a query "SELECT name FROM account WHERE employees <10." The query builder 415 may interpret this query using the corresponding code to create a query string for execution:

```
new QueryBuilder( )
    .fields('name')
    .fromObject('account')
    .filter('employees', QueryBuilder.OPR_LT, 10)
    .fetch( )
```

In a similar manner, the query builder 415 may handle any query functions using code-based solutions, query parsing, natural language processing, metadata analysis, mappings, or any combination thereof. For examples, the query builder 415 may support select functionality, count functionality, relationship queries, where functionality, in filter functionality, default and filter functionality, simple or filter functionality, autodetect type functionality, limit functionality, or any combination of these or other query functions.

Figure 5:
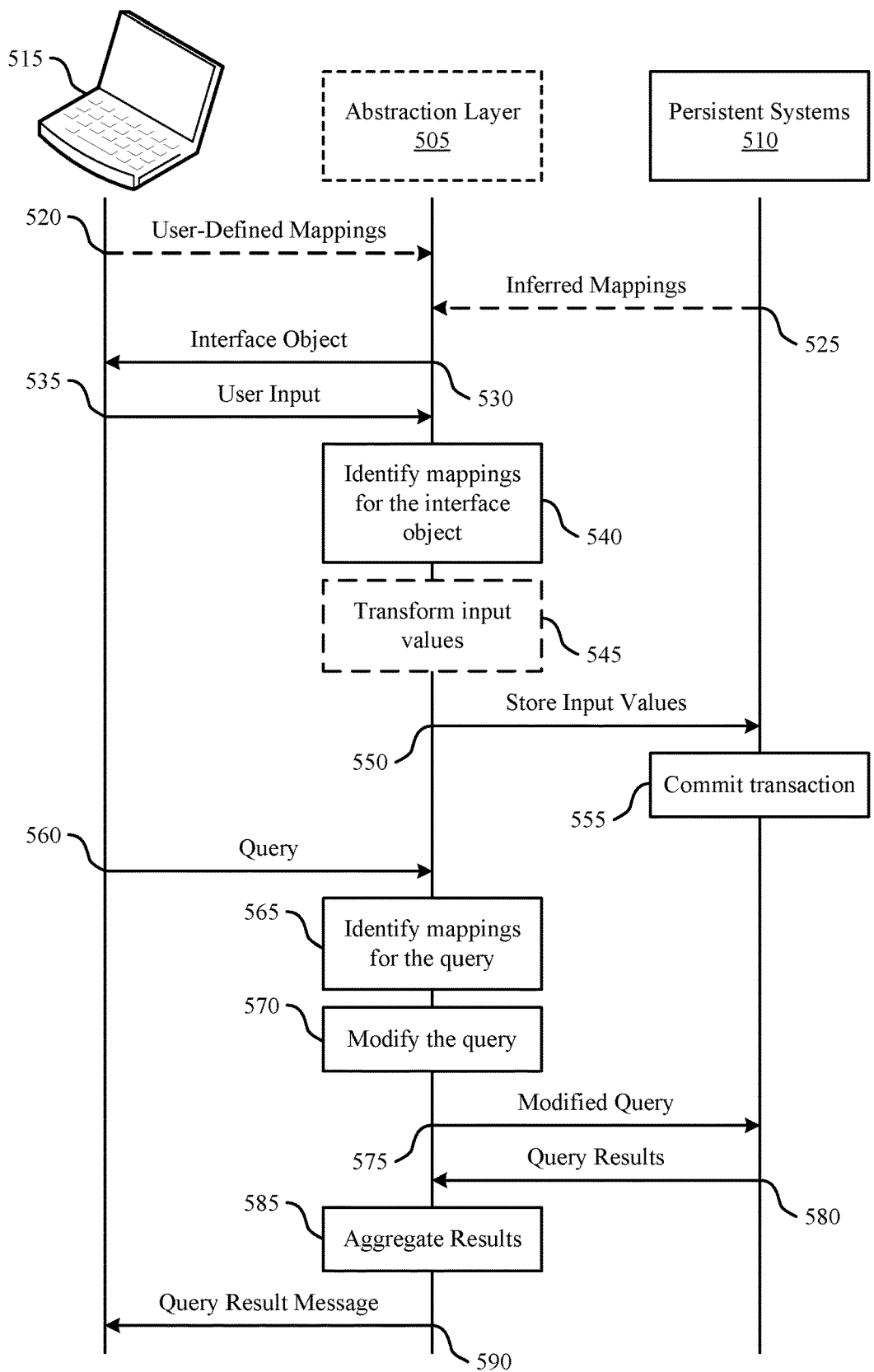
FIG. 5 illustrates an example of a process flow that supports a computerized implementation framework to abstract data object definitions across multiple computing environments in accordance with aspects of the present disclosure.

FIG. 5 illustrates an example of a process flow 500 that supports a computerized implementation framework to abstract data object definitions across multiple computing environments in accordance with aspects of the present disclosure. The process flow 500 may implement aspects of a cloud computing system, such as a system 100 or 200 as described with reference to FIGS. 1 and 2. Such systems may implement mapping 300 and query handling processes 400 at an abstraction layer as described with reference to FIGS. 3 and 4. The process flow 500 may include an abstraction layer 505 (e.g., running on one more computing devices or systems) supporting a set of persistent systems 510. The abstraction layer 505 may support abstracted access by a user device 515 or another system or package to data entities stored in the persistent systems 510. Alternative examples of the following may be implemented, where some steps are performed in a different order than described or are not performed at all. In some cases, steps may include additional features not mentioned below, or further steps may be added.

At 520, a user may define one or more metadata entities for the abstraction layer 505. For example, the abstraction layer 505 may receive, from the user device 515, a user input defining one or more mappings from interface entities to data entities. The abstraction layer 505 may update a metadata entity (e.g., in a metadata file, such as an XML, file, a JSON file, or some other metadata file) based on the user input.

In some cases, at 525, the abstraction layer 505 may infer one or more mappings based on the persistent systems 510. For example, the abstraction layer 505 may identify one or more interface entities with undefined mappings to persistent entities. As such, the abstraction layer 505 may analyze the metadata for the one or more interface entities and the metadata for one or more persistent entities and may automatically infer mappings (e.g., determine mappings on-the-fly). In some cases, the abstraction layer 505 may check the abstraction layer 505 for a user-defined mapping and may determine the mapping on-the-fly based on failing to identify the user-defined mapping.

At 530, the abstraction layer 505 may send an interface corresponding to an object to the user device 515 for display. For example, a user may request access to an object in a user interface. The abstraction layer 505 may determine whether the object corresponds to an interface object and may determine whether to present the interface for the interface object. For example, the abstraction layer 505 may determine whether to display an interface corresponding to an interface object or an interface corresponding to a data object based on metadata, a user identifier, a user role, one or more permissions, or any combination thereof.

If the abstraction layer 505 determines to use the interface object, the abstraction layer 505 may send, for display at the user device 515, the interface corresponding to the interface object, the interface object being based in part on a first metadata entity. The first metadata entity may support (e.g., define at least part of) the abstraction layer 505 for the set of persistent systems 510. The abstraction layer 505 may define relationships between objects in the set of persistent systems 510. In some examples, the abstraction layer 505 may be defined by a software provider (e.g., an ISV) and may be configurable (e.g., through an abstraction layer interface) by a user corresponding to a tenant of a multi-tenant cloud computing platform (e.g., of the persistent systems 510). Additionally or alternatively, the abstraction layer 505 may be configurable by the set of persistent systems 510 to provide one or more second metadata entities to the abstraction layer 505 to map relationships between the interface object and one or more data objects of the set of persistent systems 510. In this way, the abstraction layer 505 may be tenant-specific and may run on the persistent systems 510.

At 535, the abstraction layer 505 may receive, from the user device 515, a user input to the interface indicating a value for an interface field of the interface object. At 540, the abstraction layer 505 may identify, based on one or more metadata entities (e.g., at least one of the first metadata entity and the one or more second metadata entities), a mapping for the input value. For example, the mapping may include a first mapping between the interface object and one or more data objects stored in one or more persistent systems 510 of the set of persistent systems 510 and a second mapping between the interface field and one or more data fields for the one or more data objects. The first mapping may point to a standard object across tenants, a custom object for a specific tenant, an external object at a different system, or any combination thereof. The second mapping may point to a standard field, a custom field, an external field, or any combination thereof. The first mapping, the second mapping, or both, may be user-defined, ISV-defined, global, inferred, or some combination thereof. The first mapping and the second mapping may resolve relationships between the interface object and the one or more data objects defined at the one or more persistent systems 510.

At 545, the abstraction layer 505 may identify, based on at least one of the first metadata entity and the one or more second metadata entities), a transformation applicable to the value and may transform the value according to the transformation. In some cases, the transformation may be defined in the metadata entity (e.g., in-line or in a class). In some other cases, the transformation may be inferred based on metadata for the interface object, the interface field, the one or more data objects, the one or more data fields, or a combination thereof. A transformation may support a union or merging for multiple values, splitting a value, performing one or more calculations based on one or more values, changing a field type, or any other applicable transformation.

At 550, the abstraction layer 505 may store the value in the set of persistent systems according to the mapping. For examples, the abstraction layer 505 may store a value based on the input value in each of the one or more data fields of the corresponding one or more data objects across the one or more persistent systems 510 based on the first mapping, the second mapping, and any relevant transformations. In an example, the abstraction layer 505 may store, at a first persistent system 510, a first value for the interface object based on the first mapping and the second mapping, where storing the first value corresponds to a transaction in the set of persistent systems 510. The abstraction layer 505 may further store, at a second persistent system 510, a second value for the interface object based on the first mapping and the second mapping, where storing the second value corresponds to the same transaction in the set of persistent systems 510. A single commit may be performed at 555 for this transaction across the set of persistent systems 510 (e.g., rather than performing separate commits for separate persistent systems 510). This single commit may maintain data integrity and continuity between the different persistent systems 510.

The abstraction layer 505 may support query handling (e.g., as described with reference to FIG. 4). For example, at 560, the abstraction layer 505 may receive (e.g., intercept) a query message for the interface field of the interface object. At 565, the abstraction layer 505 may identify mappings for the query based on the metadata entity. For example, if the query is an example of a query message requesting data related to the interface field of the interface object, the abstraction layer 505 may identify the first mapping and the second mapping. At 570, the abstraction layer 505 may modify the query based on the first mapping and the second mapping. For example, the abstraction layer 505 may rewrite the query or may generate one or more sub-queries. At 575, the abstraction layer 505 may send the modified query (e.g., one or more sub-queries) to the set of persistent systems 510. Specifically, the abstraction layer 505 may route at least a portion of the modified query message to each persistent system 510 of the one or more persistent systems 510 based on the first mapping.

At 580, the abstraction layer 505 may receive a first query result from a first persistent system 510 based on the routing and may receive a second query result from a second persistent system 510 based on the routing. At 585, the abstraction layer 505 may aggregate the query results to construct a query result message based on the first query result and the second query result. At 590, the abstraction layer 505 may send the query result message to the user device 515 in response to the query message. In this way, the abstraction layer 505 may run a single query across multiple persistent systems 510 transparent to the querying entity to satisfy a query request in a holistic manner for the multiple persistent systems 510.

By using the abstraction layer 505, a multi-tenant cloud computing platform may reduce the complexity of inter-package dependencies. For example, the abstraction layer 505 may receive a software package to install for a tenant of the multi-tenant cloud computing platform, where the software package include one or more dependencies on data objects defined at the one or more persistent systems 510. The abstraction layer 505 may update the dependencies to instead depend on interface objects. The abstraction layer 505 may use the interface objects, mappings, transformations, or some combination thereof to resolve conflicts between the objects for the software package to install and the objects stored in the persistent systems 510.

Figure 6:
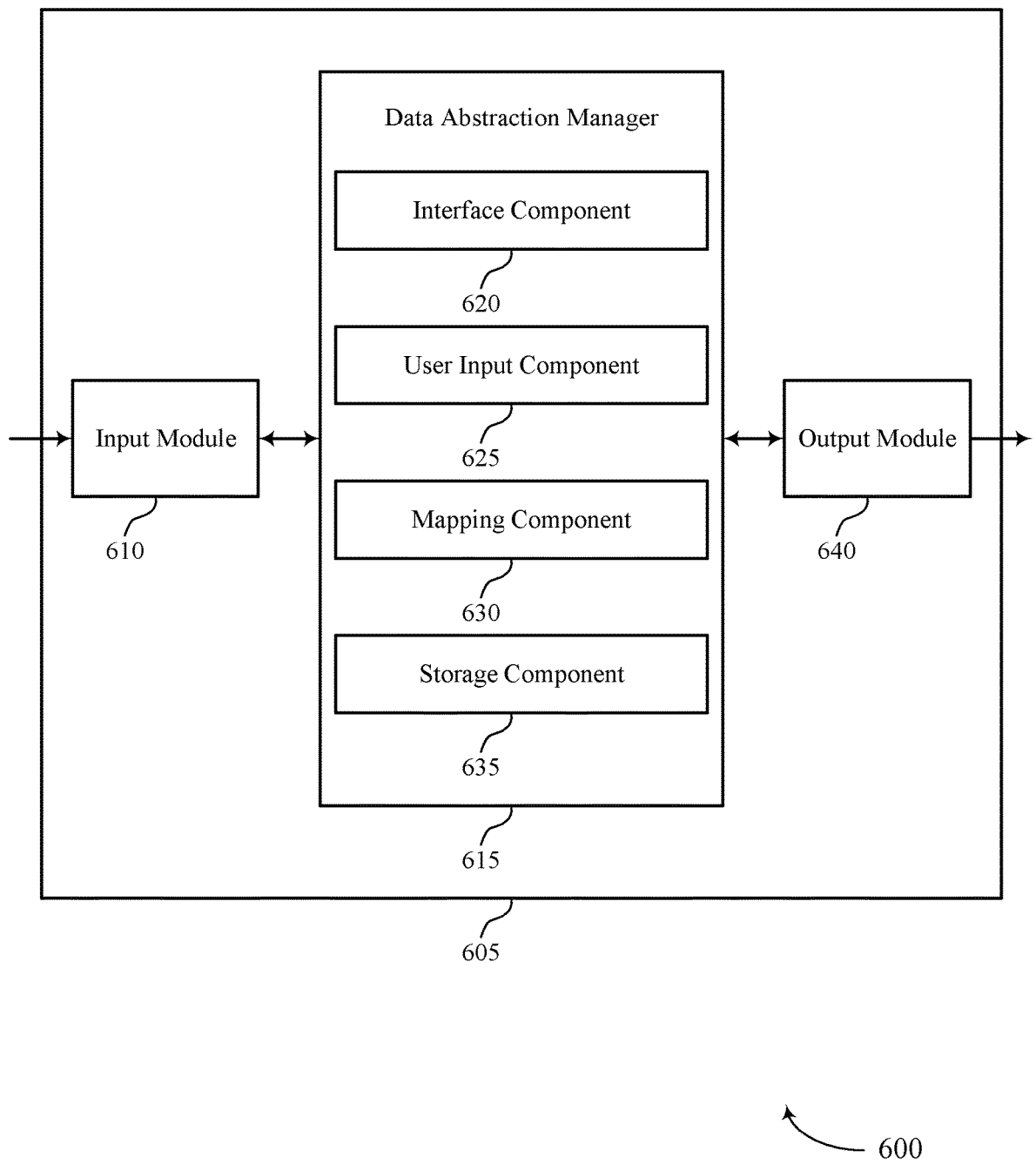
FIG. 6 shows a block diagram of an apparatus that supports a computerized implementation framework to abstract data object definitions across multiple computing environments in accordance with aspects of the present disclosure.

FIG. 6 shows a block diagram 600 of an apparatus 605 that supports a computerized implementation framework to abstract data object definitions across multiple computing environments in accordance with aspects of the present disclosure. The apparatus 605 may include an input module 610, a data abstraction manager 615, and an output module 640. The apparatus 605 may also include a processor. Each of these components may be in communication with one another (e.g., via one or more buses). In some cases, the apparatus 605 may be an example of a user device, a server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data abstraction manager 615 to support an abstraction layer for data modeling. In some cases, the input module 610 may be a component of an input/output (I/O) controller 815 as described with reference to FIG. 8.

The data abstraction manager 615 may include an interface component 620, a user input component 625, a mapping component 630, and a storage component 635. The data abstraction manager 615 may be an example of aspects of the data abstraction manager 705 or 810 described with reference to FIGS. 7 and 8.

The data abstraction manager 615 and/or at least some of its various sub-components may be implemented in hardware, software executed by a processor, firmware, or any combination thereof. If implemented in software executed by a processor, the functions of the data abstraction manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data abstraction manager 615 and/or at least some of its various sub-components may be physically located at various positions, including being distributed such that portions of functions are implemented at different physical locations by one or more physical devices. In some examples, the data abstraction manager 615 and/or at least some of its various sub-components may be a separate and distinct component in accordance with various aspects of the present disclosure. In other examples, the data abstraction manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The interface component 620 may send, for display at a user device, an interface corresponding to an interface object, the interface object being based on a first metadata entity. The first metadata entity may define at least in part an abstraction layer to define relationships between objects in a set of persistent systems. The abstraction layer may be defined by a software provider (e.g., an ISV) and may be configurable (e.g., through an abstraction layer interface) by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. The user input component 625 may receive, from the user device, a user input to the interface indicating a value for an interface field of the interface object.

The mapping component 630 may identify, based on at least one of the first metadata entity and the one or more second metadata entities, a first mapping between the interface object and the one or more data objects stored in one or more persistent systems of the set of persistent systems and a second mapping between the interface field and one or more data fields for the one or more data objects. The first mapping and the second mapping may resolve the relationships between the interface object and the one or more data objects defined at the one or more persistent systems. The storage component 635 may store, at a persistent system of the one or more persistent systems, the value in a data field of the one or more data fields for a data object of the one or more data objects based on the first mapping and the second mapping.

The output module 640 may manage output signals for the apparatus 605. For example, the output module 640 may receive signals from other components of the apparatus 605, such as the data abstraction manager 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
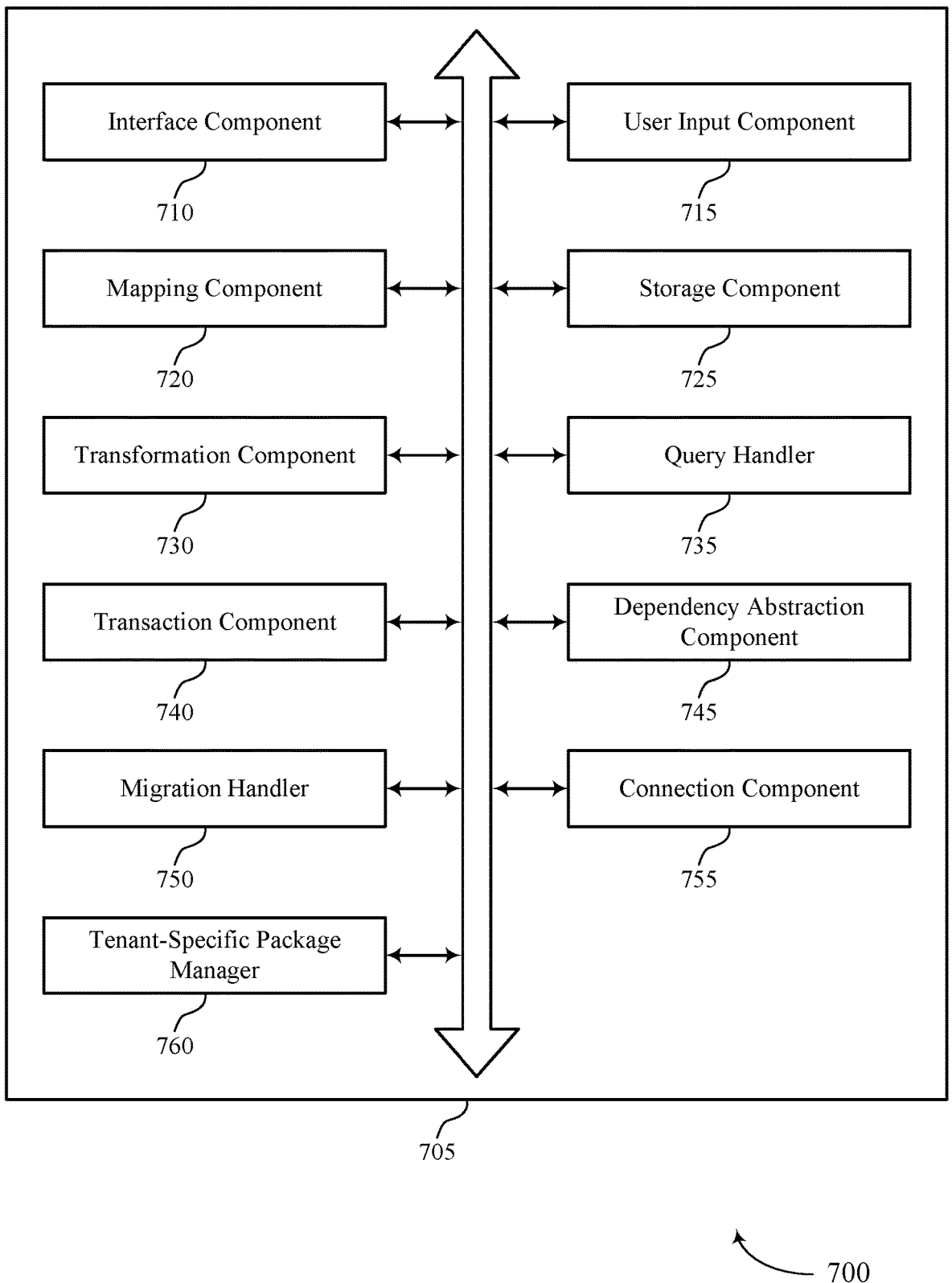
FIG. 7 shows a block diagram of a data abstraction manager that supports a computerized implementation framework to abstract data object definitions across multiple computing environments in accordance with aspects of the present disclosure.

FIG. 7 shows a block diagram 700 of a data abstraction manager 705 that supports a computerized implementation framework to abstract data object definitions across multiple computing environments in accordance with aspects of the present disclosure. The data abstraction manager 705 may be an example of aspects of a data abstraction manager 615 or a data abstraction manager 810 described herein. The data abstraction manager 705 may include an interface component 710, a user input component 715, a mapping component 720, a storage component 725, a transformation component 730, a query handler 735, a transaction component 740, a dependency abstraction component 745, a migration handler 750, a connection component 755, a tenant-specific package manager 760, or a combination of these or other components. Each of these components may communicate, directly or indirectly, with one another (e.g., via one or more buses).

The interface component 710 may send, for display at a user device, an interface corresponding to an interface object, the interface object being based on a first metadata entity. The first metadata entity may define at least in part an abstraction layer to define relationships between objects in a set of persistent systems. The abstraction layer may be defined by a software provider and may be configurable (e.g., through an abstraction layer interface) by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. In some cases, the software provider may define a default abstraction layer for a set of tenants of the multi-tenant cloud computing platform, and the user may define the abstraction layer based on the default abstraction layer and one or more customizations specific to the tenant.

The user input component 715 may receive, from the user device, a user input to the interface indicating a value for an interface field of the interface object. The mapping component 720 may identify, based on at least one of the first metadata entity and the one or more second metadata entities, a first mapping between the interface object and the one or more data objects stored in one or more persistent systems of the set of persistent systems. Additionally, the mapping component 720 may identify, based on the metadata entity, a second mapping between the interface field and one or more data fields for the one or more data objects. The first mapping and the second mapping may resolve the relationships (e.g., resolve conflicts) between the interface object and the one or more data objects defined at the one or more persistent systems.

The storage component 725 may store, at a persistent system of the one or more persistent systems, the value in a data field of the one or more data fields for a data object of the one or more data objects based on the first mapping and the second mapping.

The transformation component 730 may identify, based on at least one of the first metadata entity and the one or more second metadata entities, a transformation applicable to the value and may transform the value according to the transformation, where the storing includes storing the transformed value in the data field.

The query handler 735 may receive a query message for the interface field of the interface object, may modify the query message based on the first mapping and the second mapping, and may route at least a portion of the modified query message to each persistent system of the one or more persistent systems based on the first mapping. In some examples, the query handler 735 may receive a first query result from a first persistent system of the one or more persistent systems based on the routing and may receive a second query result from a second persistent system of the one or more persistent systems different from the first persistent system based on the routing. In some such examples, the query handler 735 may construct a query result message based on the first query result and the second query result and may send the query result message in response to the query message.

In some examples, the first mapping may be between the interface object and a set of data objects stored in the set of persistent systems. In some cases, the storing may involve the storage component 725 storing, at a first persistent system of the set of persistent systems, a first value for the interface object based on the first mapping and the second mapping, where storing the first value corresponds to a transaction in the set of persistent systems. Additionally, the storing may involve the storage component 725 storing, at a second persistent system of the set of persistent systems, a second value for the interface object based on the first mapping and the second mapping, where storing the second value corresponds to the transaction in the set of persistent systems. The transaction component 740 may commit the transaction across the set of persistent systems based on storing the first value and storing the second value.

In some examples, the second mapping may be between the interface field and a set of data fields, and the transformation component 730 may transform the value into a set of values corresponding to the set of data fields.

The dependency abstraction component 745 may receive a software package to install for the tenant of the multi-tenant cloud computing platform, the software package including a dependency on the one or more data objects defined at the one or more persistent systems. In some examples, the dependency abstraction component 745 may update the dependency from depending on the one or more data objects defined at the one or more persistent systems to depending on the interface object based on the abstraction layer.

In some examples, identifying the first mapping and the second mapping may involve the mapping component 720 determining the first mapping, the second mapping, or both on-the-fly based on at least one of the first metadata entity and the one or more second metadata entities, metadata for the one or more data objects, metadata for the one or more data fields, a user preference, a tenant preference, or a combination thereof. In some examples, the mapping component 720 may check the abstraction layer for a user-defined mapping corresponding to the first mapping, the second mapping, or both, where the first mapping, the second mapping, or both are determined on-the-fly based on the checking including failing to identify the user-defined mapping.

In some examples, the mapping component 720 may receive, from the user device, an additional user input defining the first mapping, the second mapping, or both. In some such examples, the mapping component 720 may update the first metadata entity, the abstraction layer, or both based on the additional user input. In some examples, the mapping component 720 may send, for display at the user device, a mapping interface indicating the first mapping, the second mapping, or both.

In some cases, the persistent system may be an example of a first persistent system. The migration handler 750 may migrate the data object from the first persistent system to a second persistent system and may automatically update the first mapping based on the migrating. In some examples, the migration handler 750 may maintain the interface object based on automatically updating the first mapping to be between the interface object and at least the migrated data object stored in the second persistent system.

In some examples, the user input component 715 may receive a user identifier associated with the user device, and the interface component 710 may determine to display the interface corresponding to the interface object at the user device based on the user identifier. In some examples, the user input component 715 may receive an additional user identifier associated with an additional user device, and the interface component 710 may determine to display an additional interface corresponding to the data object at the additional user device based on the additional user identifier.

The connection component 755 may communicate with the set of persistent systems via a set of adapters, where the storing may be based on the communicating.

In some examples, the abstraction layer may be a first abstraction layer specific to a first tenant of the multi-tenant cloud computing platform. In some such examples, the interface component 710 may implement a second abstraction layer specific to a second tenant of the multi-tenant cloud computing platform to define additional relationships between additional objects in an additional set of persistent systems. In some cases, the tenant-specific package manager 760 may support one or more first software packages for the first tenant based on the first abstraction layer and may support one or more second software packages for the second tenant based on the second abstraction layer and independent of the one or more first software packages.

In some cases, the set of persistent systems may include a core persistent data store for the multi-tenant cloud computing platform, a tenant-specific persistent data store for the multi-tenant cloud computing platform, one or more persistent data stores for external systems associated with the multi-tenant cloud computing platform, a set of cloud computing platforms, or a combination thereof. In some cases, the data object may be an example of a standard data object across tenants in the core persistent data store for the multi-tenant cloud computing platform, a custom data object for a tenant in the tenant-specific persistent data store for the multi-tenant cloud computing platform, or an external data object in a persistent data store for an external system associated with the multi-tenant cloud computing platform.

Figure 8:
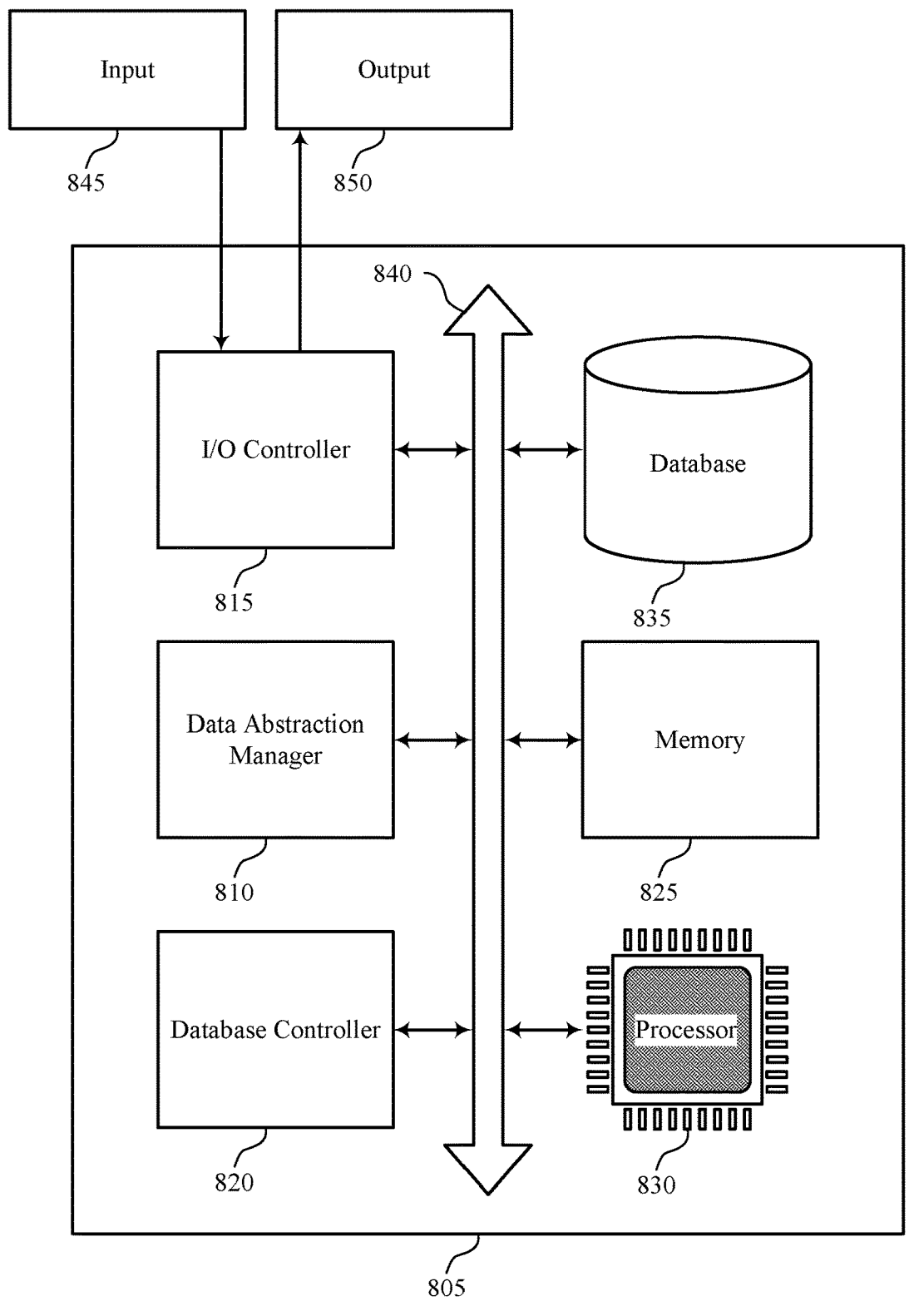
FIG. 8 shows a diagram of a system including a device that supports a computerized implementation framework to abstract data object definitions across multiple computing environments in accordance with aspects of the present disclosure.

FIG. 8 shows a diagram of a system 800 including a device 805 that supports a computerized implementation framework to abstract data object definitions across multiple computing environments in accordance with aspects of the present disclosure. The device 805 may be an example of or include the components of a server (e.g., an application server, a database server, a cloud-based server, a server cluster, a virtual machine, a container, a worker, or any other device or system supporting data processing) or an apparatus 605 as described herein. The device 805 may include components for bi-directional data communications including components for transmitting and receiving communications, including a data abstraction manager 810, an I/O controller 815, a database controller 820, memory 825, a processor 830, and a database 835. These components may be in electronic communication via one or more buses (e.g., bus 840).

The data abstraction manager 810 may be an example of a data abstraction manager 615 or 705 as described herein. For example, the data abstraction manager 810 may perform any of the methods or processes described above with reference to FIGS. 6 and 7. In some cases, the data abstraction manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting an abstraction layer across multiple computing environments).

Figure 9:
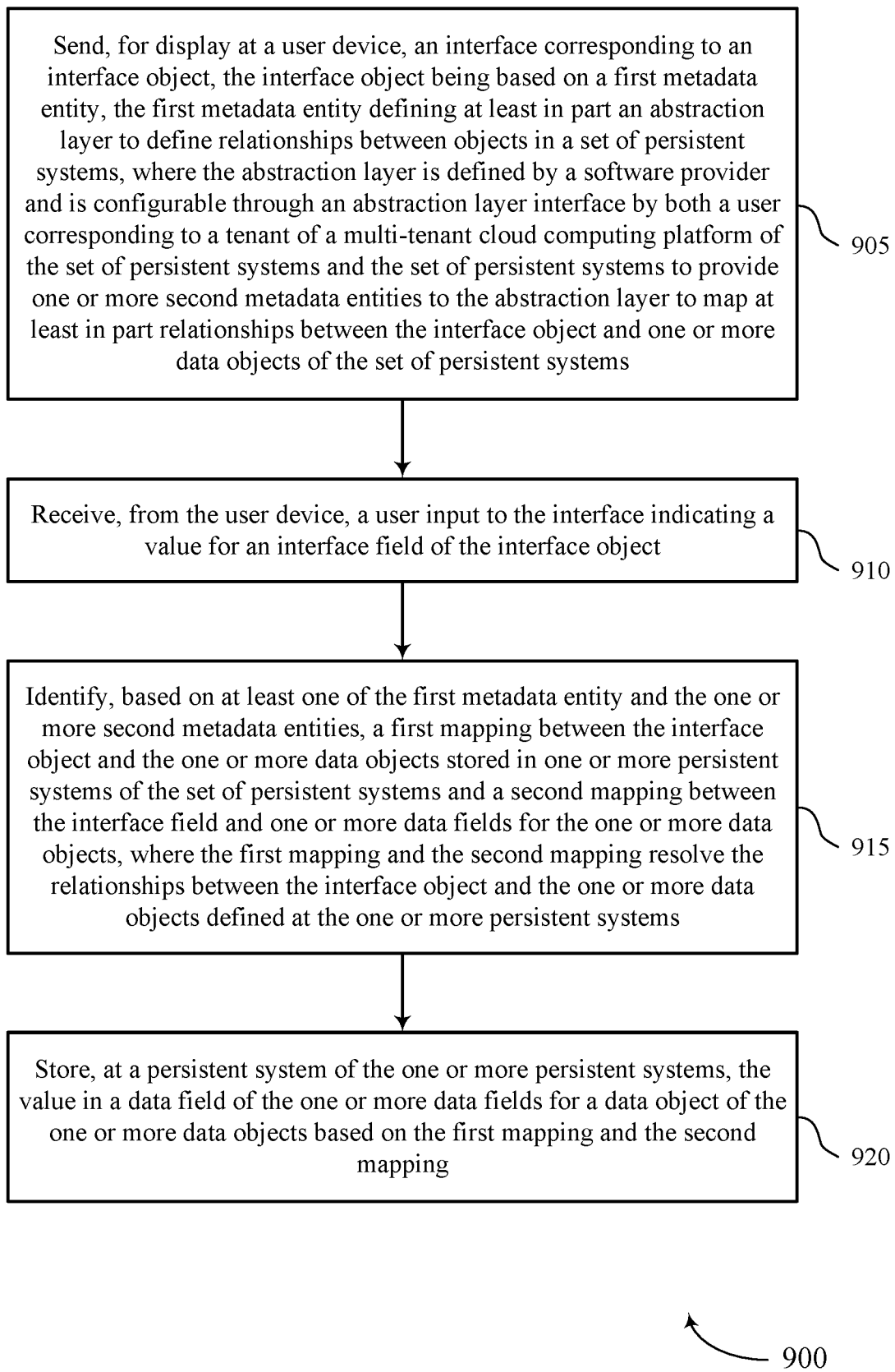
FIGS. 9 through 11 show flowcharts illustrating methods that support computerized implementation frameworks to abstract data object definitions across multiple computing environments in accordance with aspects of the present disclosure.

FIG. 9 shows a flowchart illustrating a method 900 that supports a computerized implementation framework to abstract data object definitions across multiple computing environments in accordance with aspects of the present disclosure. The operations of method 900 may be implemented by a server (e.g., an application server, a database server, a cloud-based server, a server cluster, a virtual machine, a container, a worker, or any other device or system supporting data processing) or its components as described herein. For example, the operations of method 900 may be performed by a data abstraction manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 905, the server may send, for display at a user device, an interface corresponding to an interface object, the interface object being based on a first metadata entity, the first metadata entity defining at least in part an abstraction layer to define relationships between objects in a set of persistent systems. The abstraction layer may be defined by a software provider and may be configurable through an abstraction layer interface by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. The operations of 905 may be performed according to the methods described herein. In some examples, aspects of the operations of 905 may be performed by an interface component as described with reference to FIGS. 6 through 8.

At 910, the server may receive, from the user device, a user input to the interface indicating a value for an interface field of the interface object. The operations of 910 may be performed according to the methods described herein. In some examples, aspects of the operations of 910 may be performed by a user input component as described with reference to FIGS. 6 through 8.

At 915, the server may identify, based on at least one of the first metadata entity and the one or more second metadata entities, a first mapping between the interface object and the one or more data objects stored in one or more persistent systems of the set of persistent systems and a second mapping between the interface field and one or more data fields for the one or more data objects. The first mapping and the second mapping may resolve the relationships between the interface object and the one or more data objects defined at the one or more persistent systems. The operations of 915 may be performed according to the methods described herein. In some examples, aspects of the operations of 915 may be performed by a mapping component as described with reference to FIGS. 6 through 8.

At 920, the server may store, at a persistent system of the one or more persistent systems, the value in a data field of the one or more data fields for a data object of the one or more data objects based on the first mapping and the second mapping. The operations of 920 may be performed according to the methods described herein. In some examples, aspects of the operations of 920 may be performed by a storage component as described with reference to FIGS. 6 through 8.

Figure 10:
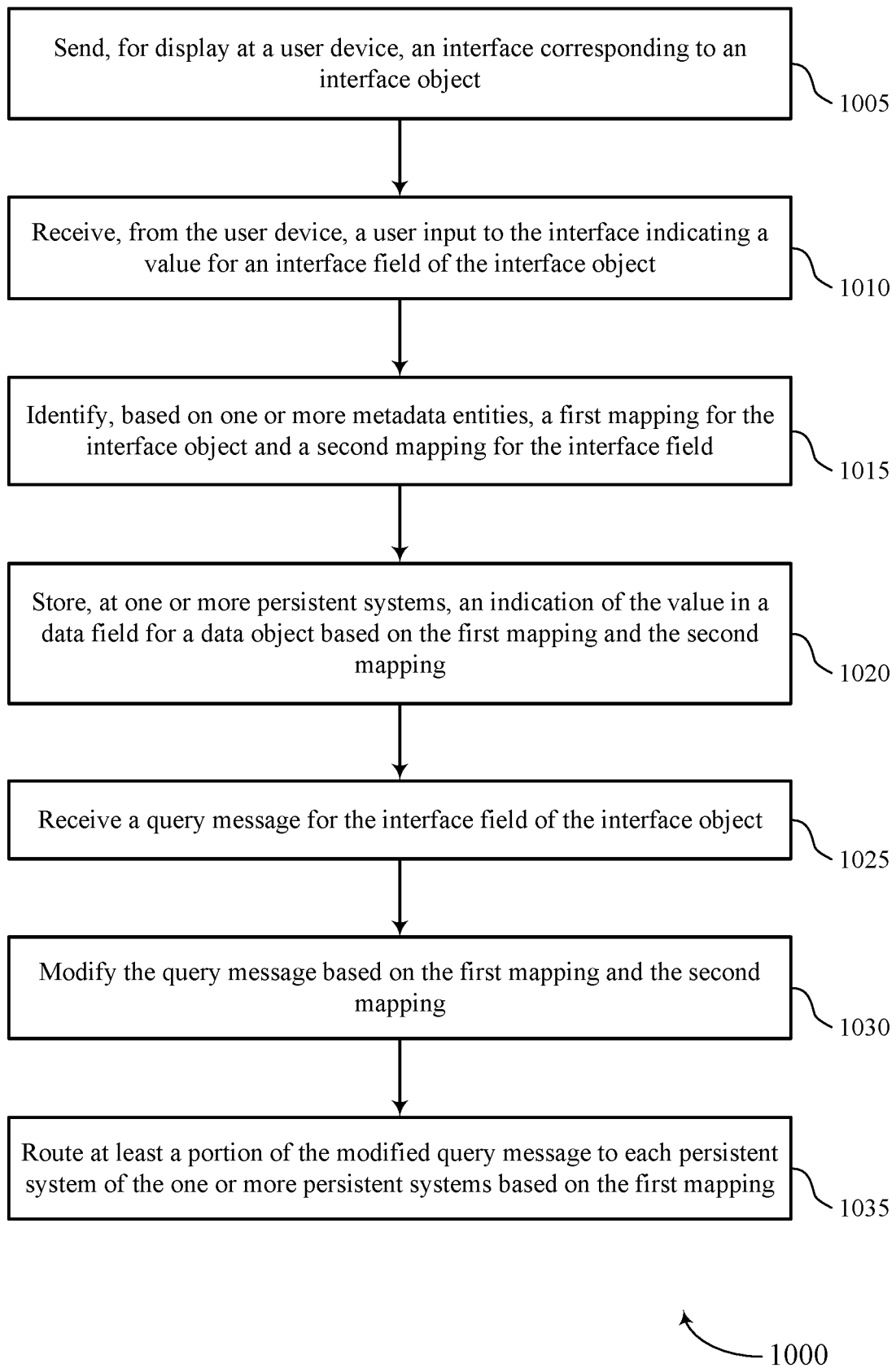

FIG. 10 shows a flowchart illustrating a method 1000 that supports a computerized implementation framework to abstract data object definitions across multiple computing environments in accordance with aspects of the present disclosure. The operations of method 1000 may be implemented by a server or its components as described herein. For example, the operations of method 1000 may be performed by a data abstraction manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1005, the server may send, for display at a user device, an interface corresponding to an interface object. The interface object may be based on a first metadata entity. The first metadata entity may support at least part of an abstraction layer defining relationships between objects in a set of persistent systems. The operations of 1005 may be performed according to the methods described herein. In some examples, aspects of the operations of 1005 may be performed by an interface component as described with reference to FIGS. 6 through 8.

At 1010, the server may receive, from the user device, a user input to the interface indicating a value for an interface field of the interface object. The operations of 1010 may be performed according to the methods described herein. In some examples, aspects of the operations of 1010 may be performed by a user input component as described with reference to FIGS. 6 through 8.

At 1015, the server may identify, based on one or more metadata entities, a first mapping between the interface object and one or more data objects stored in one or more persistent systems of the set of persistent systems and a second mapping between the interface field and one or more data fields for the one or more data objects, where the first mapping and the second mapping resolve relationships between the interface object and the one or more data objects defined at the one or more persistent systems. The operations of 1015 may be performed according to the methods described herein. In some examples, aspects of the operations of 1015 may be performed by a mapping component as described with reference to FIGS. 6 through 8.

At 1020, the server may store, at a persistent system of the one or more persistent systems, the value in a data field of the one or more data fields for a data object of the one or more data objects based on the first mapping and the second mapping. The operations of 1020 may be performed according to the methods described herein. In some examples, aspects of the operations of 1020 may be performed by a storage component as described with reference to FIGS. 6 through 8.

At 1025, the server may receive a query message for the interface field of the interface object. The operations of 1025 may be performed according to the methods described herein. In some examples, aspects of the operations of 1025 may be performed by a query handler as described with reference to FIGS. 6 through 8.

At 1030, the server may modify the query message based on the first mapping and the second mapping. The operations of 1030 may be performed according to the methods described herein. In some examples, aspects of the operations of 1030 may be performed by a query handler as described with reference to FIGS. 6 through 8.

At 1035, the server may route at least a portion of the modified query message to each persistent system of the one or more persistent systems based on the first mapping. The operations of 1035 may be performed according to the methods described herein. In some examples, aspects of the operations of 1035 may be performed by a query handler as described with reference to FIGS. 6 through 8.

Figure 11:
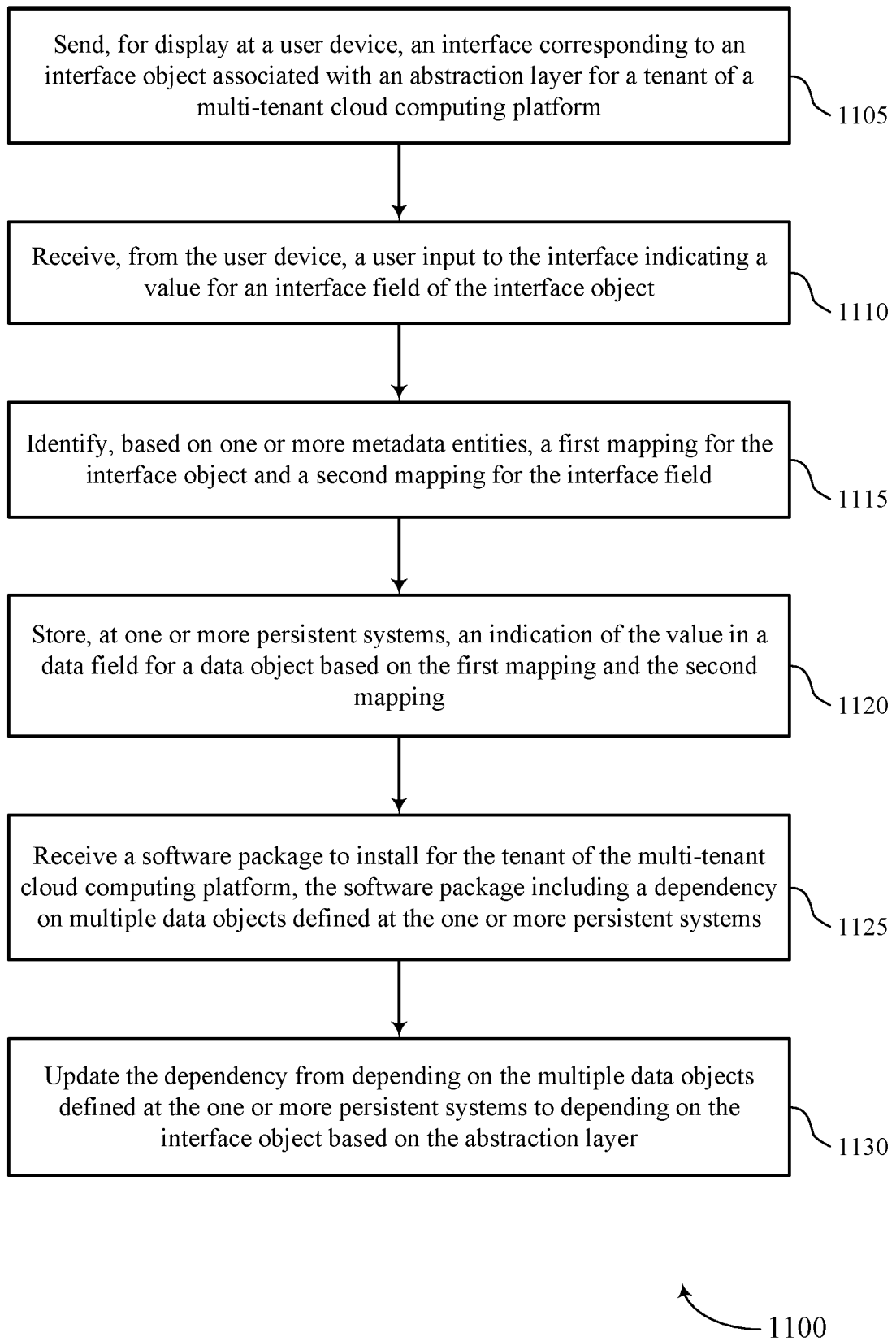

FIG. 11 shows a flowchart illustrating a method 1100 that supports a computerized implementation framework to abstract data object definitions across multiple computing environments in accordance with aspects of the present disclosure. The operations of method 1100 may be implemented by a server or its components as described herein. For example, the operations of method 1100 may be performed by a data abstraction manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1105, the server may send, for display at a user device, an interface corresponding to an interface object. The interface object may be based on a metadata entity. The metadata entity may support an abstraction layer to define relationships between objects in a set of persistent systems. The operations of 1105 may be performed according to the methods described herein. In some examples, aspects of the operations of 1105 may be performed by an interface component as described with reference to FIGS. 6 through 8.

At 1110, the server may receive, from the user device, a user input to the interface indicating a value for an interface field of the interface object. The operations of 1110 may be performed according to the methods described herein. In some examples, aspects of the operations of 1110 may be performed by a user input component as described with reference to FIGS. 6 through 8.

At 1115, the server may identify, based on one or more metadata entities, a first mapping between the interface object and one or more data objects stored in one or more persistent systems of the set of persistent systems and a second mapping between the interface field and one or more data fields for the one or more data objects, where the first mapping and the second mapping resolve relationships between the interface object and the one or more data objects defined at the one or more persistent systems. The operations of 1115 may be performed according to the methods described herein. In some examples, aspects of the operations of 1115 may be performed by a mapping component as described with reference to FIGS. 6 through 8.

At 1120, the server may store, at a persistent system of the one or more persistent systems, the value in a data field of the one or more data fields for a data object of the one or more data objects based on the first mapping and the second mapping. The operations of 1120 may be performed according to the methods described herein. In some examples, aspects of the operations of 1120 may be performed by a storage component as described with reference to FIGS. 6 through 8.

At 1125, the server may receive a software package to install for the tenant of the multi-tenant cloud computing platform, the software package including a dependency on the one or more data objects defined at the one or more persistent systems. The operations of 1125 may be performed according to the methods described herein. In some examples, aspects of the operations of 1125 may be performed by a dependency abstraction component as described with reference to FIGS. 6 through 8.

At 1130, the server may update the dependency from depending on the one or more data objects defined at the one or more persistent systems to depending on the interface object based on the abstraction layer. As such, the system may reduce the package's dependency on other packages or other underlying data schemas. The operations of 1130 may be performed according to the methods described herein. In some examples, aspects of the operations of 1130 may be performed by a dependency abstraction component as described with reference to FIGS. 6 through 8.

A method for data management is described. The method may include sending, for display at a user device, an interface corresponding to an interface object, the interface object being based on a first metadata entity, the first metadata entity defining at least in part an abstraction layer to define relationships between objects in a set of persistent systems, where the abstraction layer is defined by a software provider and is configurable through an abstraction layer interface by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. The method may further include receiving, from the user device, a user input to the interface indicating a value for an interface field of the interface object and identifying, based on at least one of the first metadata entity and the one or more second metadata entities, a first mapping between the interface object and one or more data objects stored in one or more persistent systems of the set of persistent systems and a second mapping between the interface field and one or more data fields for the one or more data objects, where the first mapping and the second mapping resolve the relationships between the interface object and the one or more data objects defined at the one or more persistent systems. The method may further include storing, at a persistent system of the one or more persistent systems, the value in a data field of the one or more data fields for a data object of the one or more data objects based on the first mapping and the second mapping.

An apparatus for data management is described. The apparatus may include a processor, memory coupled with the processor, and instructions stored in the memory. The instructions may be executable by the processor to cause the apparatus to send, for display at a user device, an interface corresponding to an interface object, the interface object being based on a first metadata entity, the first metadata entity defining at least in part an abstraction layer to define relationships between objects in a set of persistent systems, where the abstraction layer is defined by a software provider and is configurable through an abstraction layer interface by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. The instructions may be further executable by the processor to cause the apparatus to receive, from the user device, a user input to the interface indicating a value for an interface field of the interface object and identify, based on at least one of the first metadata entity and the one or more second metadata entities, a first mapping between the interface object and one or more data objects stored in one or more persistent systems of the set of persistent systems and a second mapping between the interface field and one or more data fields for the one or more data objects, where the first mapping and the second mapping resolve the relationships between the interface object and the one or more data objects defined at the one or more persistent systems. The instructions may be further executable by the processor to cause the apparatus to store, at a persistent system of the one or more persistent systems, the value in a data field of the one or more data fields for a data object of the one or more data objects based on the first mapping and the second mapping.

Another apparatus for data management is described. The apparatus may include means for sending, for display at a user device, an interface corresponding to an interface object, the interface object being based on a first metadata entity, the first metadata entity defining at least in part an abstraction layer to define relationships between objects in a set of persistent systems, where the abstraction layer is defined by a software provider and is configurable through an abstraction layer interface by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. The apparatus may further include means for receiving, from the user device, a user input to the interface indicating a value for an interface field of the interface object and means for identifying, based on at least one of the first metadata entity and the one or more second metadata entities, a first mapping between the interface object and the one or more data objects stored in one or more persistent systems of the set of persistent systems and a second mapping between the interface field and one or more data fields for the one or more data objects, where the first mapping and the second mapping resolve the relationships between the interface object and the one or more data objects defined at the one or more persistent systems. The apparatus may further include means for storing, at a persistent system of the one or more persistent systems, the value in a data field of the one or more data fields for a data object of the one or more data objects based on the first mapping and the second mapping.

A non-transitory computer-readable medium storing code for data management is described. The code may include instructions executable by a processor to send, for display at a user device, an interface corresponding to an interface object, the interface object being based on a first metadata entity, the first metadata entity defining at least in part an abstraction layer to define relationships between objects in a set of persistent systems, where the abstraction layer is defined by a software provider and is configurable through an abstraction layer interface by both a user corresponding to a tenant of a multi-tenant cloud computing platform of the set of persistent systems and the set of persistent systems to provide one or more second metadata entities to the abstraction layer to map at least in part relationships between the interface object and one or more data objects of the set of persistent systems. The code may further include instructions executable by the processor to receive, from the user device, a user input to the interface indicating a value for an interface field of the interface object and identify, based on at least one of the first metadata entity and the one or more second metadata entities, a first mapping between the interface object and the one or more data objects stored in one or more persistent systems of the set of persistent systems and a second mapping between the interface field and one or more data fields for the one or more data objects, where the first mapping and the second mapping resolve the relationships between the interface object and the one or more data objects defined at the one or more persistent systems. The code may further include instructions executable by the processor to store, at a persistent system of the one or more persistent systems, the value in a data field of the one or more data fields for a data object of the one or more data objects based on the first mapping and the second mapping.

Some examples of the method, apparatuses, and non-transitory computer-readable medium described herein may further include operations, features, means, or instructions for identifying, based on at least one of the first metadata entity and the one or more second metadata entities, a transformation applicable to the value and transforming the value according to the transformation, where the storing includes storing the transformed value in the data field.

Some examples of the method, apparatuses, and non-transitory computer-readable medium described herein may further include operations, features, means, or instructions for receiving a query message for the interface field of the interface object, modifying the query message based on the first mapping and the second mapping, and routing at least a portion of the modified query message to each persistent system of the one or more persistent systems based on the first mapping.

Some examples of the method, apparatuses, and non-transitory computer-readable medium described herein may further include operations, features, means, or instructions for receiving a first query result from a first persistent system of the one or more persistent systems based on the routing, receiving a second query result from a second persistent system of the one or more persistent systems different from the first persistent system based on the routing, constructing a query result message based on the first query result and the second query result, and sending the query result message in response to the query message.

In some examples of the method, apparatuses, and non-transitory computer-readable medium described herein, the first mapping may be between the interface object and a set of data objects stored in the set of persistent systems.

In some examples of the method, apparatuses, and non-transitory computer-readable medium described herein, the storing further may include operations, features, means, or instructions for storing, at a first persistent system of the set of persistent systems, a first value for the interface object based on the first mapping and the second mapping, where storing the first value corresponds to a transaction in the set of persistent systems, storing, at a second persistent system of the set of persistent systems, a second value for the interface object based on the first mapping and the second mapping, where storing the second value corresponds to the transaction in the set of persistent systems, and committing the transaction across the set of persistent systems based on storing the first value and storing the second value.

In some examples of the method, apparatuses, and non-transitory computer-readable medium described herein, the second mapping may be between the interface field and a set of data fields. Some examples of the method, apparatuses, and non-transitory computer-readable medium described herein may further include operations, features, means, or instructions for transforming the value into a set of values corresponding to the set of data fields.

Some examples of the method, apparatuses, and non-transitory computer-readable medium described herein may further include operations, features, means, or instructions for receiving a software package to install for the tenant of the multi-tenant cloud computing platform, the software package including a dependency on the one or more data objects defined at the one or more persistent systems, and updating the dependency from depending on the one or more data objects defined at the one or more persistent systems to depending on the interface object based on the abstraction layer.

In some examples of the method, apparatuses, and non-transitory computer-readable medium described herein, identifying the first mapping and the second mapping further may include operations, features, means, or instructions for determining the first mapping, the second mapping, or both on-the-fly based on at least one of the first metadata entity and the one or more second metadata entities, metadata for the one or more data objects, metadata for the one or more data fields, a user preference, a tenant preference, or a combination thereof.

Some examples of the method, apparatuses, and non-transitory computer-readable medium described herein may further include operations, features, means, or instructions for checking the abstraction layer for a user-defined mapping corresponding to the first mapping, the second mapping, or both, where the first mapping, the second mapping, or both may be determined on-the-fly based on the checking including failing to identify the user-defined mapping.

Some examples of the method, apparatuses, and non-transitory computer-readable medium described herein may further include operations, features, means, or instructions for receiving, from the user device, an additional user input defining the first mapping, the second mapping, or both and updating the first metadata entity, the abstraction layer, or both based on the additional user input.

Some examples of the method, apparatuses, and non-transitory computer-readable medium described herein may further include operations, features, means, or instructions for sending, for display at the user device, a mapping interface indicating the first mapping, the second mapping, or both.

In some examples of the method, apparatuses, and non-transitory computer-readable medium described herein, the persistent system may be a first persistent system and the method, apparatuses, and non-transitory computer-readable medium described herein may further include operations, features, means, or instructions for migrating the data object from the first persistent system to a second persistent system, automatically updating the first mapping based on the migrating, and maintaining the interface object based on automatically updating the first mapping to be between the interface object and at least the migrated data object stored in the second persistent system.

Some examples of the method, apparatuses, and non-transitory computer-readable medium described herein may further include operations, features, means, or instructions for receiving a user identifier associated with the user device and determining to display the interface corresponding to the interface object at the user device based on the user identifier.

Some examples of the method, apparatuses, and non-transitory computer-readable medium described herein may further include operations, features, means, or instructions for receiving an additional user identifier associated with an additional user device and determining to display an additional interface corresponding to the data object at the additional user device based on the additional user identifier.

Some examples of the method, apparatuses, and non-transitory computer-readable medium described herein may further include operations, features, means, or instructions for communicating with the set of persistent systems via a set of adapters, where the storing may be based on the communicating.

In some examples of the method, apparatuses, and non-transitory computer-readable medium described herein, the software provider may define a default abstraction layer for a set of tenants of the multi-tenant cloud computing platform, and the user may define the abstraction layer based on the default abstraction layer and one or more customizations specific to the tenant.

In some examples of the method, apparatuses, and non-transitory computer-readable medium described herein, the abstraction layer may be a first abstraction layer specific to a first tenant of the multi-tenant cloud computing platform. Some examples of the method, apparatuses, and non-transitory computer-readable medium described herein may further include operations, features, means, or instructions for implementing a second abstraction layer specific to a second tenant of the multi-tenant cloud computing platform to define additional relationships between additional objects in an additional set of persistent systems, supporting one or more first software packages for the first tenant based on the first abstraction layer, and supporting one or more second software packages for the second tenant based on the second abstraction layer and independent of the one or more first software packages.

In some examples of the method, apparatuses, and non-transitory computer-readable medium described herein, the set of persistent systems may include a core persistent data store for the multi-tenant cloud computing platform, a tenant-specific persistent data store for the multi-tenant cloud computing platform, one or more persistent data stores for external systems associated with the multi-tenant cloud computing platform, a set of cloud computing platforms, or a combination thereof. In some examples of the method, apparatuses, and non-transitory computer-readable medium described herein, the data object may be a standard data object across tenants in the core persistent data store for the multi-tenant cloud computing platform, a custom data object for a tenant in the tenant-specific persistent data store for the multi-tenant cloud computing platform, or an external data object in a persistent data store for an external system associated with the multi-tenant cloud computing platform.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management at a computing device, comprising:
   running, at the computing device, an abstraction layer managing dependencies between a plurality of persistent systems, the abstraction layer storing definitions for a plurality of interface objects mapping to a plurality of data objects persisted at the plurality of persistent systems;
   receiving a value to store in an interface field of an interface object of the plurality of interface objects;
   identifying, at the computing device and based at least in part on the abstraction layer, a mapping between the interface field and one or more data fields for one or more data objects of the plurality of data objects persisted at the plurality of persistent systems; and
   sending the value for storage in the one or more data fields at one or more persistent systems of the plurality of persistent systems based at least in part on the identified mapping.

2. The method of claim 1, further comprising:
   receiving, at the computing device, an indication of an update to a persistent system of the plurality of persistent systems; and
   automatically updating the abstraction layer based at least in part on the indication of the update to the persistent system.

3. The method of claim 2, wherein automatically updating the abstraction layer comprises:
   updating the mapping between the interface field and the one or more data fields, updating the interface object, creating a new interface object for the abstraction layer, or a combination thereof based at least in part on the update to the persistent system.

4. The method of claim 2, further comprising:
   sending, for display at a user device, an interface for the interface object, wherein automatically updating the abstraction layer comprises refraining from modifying the interface for the interface object.

5. The method of claim 2, wherein the abstraction layer is automatically updated based at least in part on a data schema of the persistent system, one or more dependencies for the persistent system, or a combination thereof.

6. The method of claim 1, further comprising:
   communicating with the plurality of persistent systems via a plurality of connectors between the abstraction layer and the plurality of persistent systems.

7. The method of claim 1, wherein the value is received from a persistent system of the plurality of persistent systems.

8. The method of claim 1, further comprising:
   sending, for display at a user device, the interface object, wherein the value is received from the user device.

9. The method of claim 8, wherein sending the value for storage in the one or more data fields at the one or more persistent systems is transparent to the user device.

10. The method of claim 1, wherein the abstraction layer is specific to a first tenant of a multi-tenant cloud computing platform, the method further comprising:
    running, at the computing device, one or more additional abstraction layers specific to one or more additional tenants of the multi-tenant cloud computing platform.

11. The method of claim 10, further comprising:
    determining that the value is associated with the first tenant of the multi-tenant cloud computing platform; and
    determining to use the abstraction layer specific to the first tenant based at least in part on the value being associated with the first tenant, wherein identifying the mapping is further based at least in part on determining to use the abstraction layer.

12. The method of claim 10, wherein the abstraction layer and the one or more additional abstraction layers correspond to a default abstraction layer with one or more tenant-specific customizations.

13. The method of claim 1, wherein the abstraction layer comprises a plurality of metadata entities defining the plurality of interface objects.

14. An apparatus for data management at a computing device, comprising:
    a processor;
    memory coupled with the processor; and
    instructions stored in the memory and executable by the processor to cause the apparatus to:
    run, at the computing device, an abstraction layer managing dependencies between a plurality of persistent systems, the abstraction layer storing definitions for a plurality of interface objects mapping to a plurality of data objects persisted at the plurality of persistent systems;
    receive a value to store in an interface field of an interface object of the plurality of interface objects;
    identify, at the computing device and based at least in part on the abstraction layer, a mapping between the interface field and one or more data fields for one or more data objects of the plurality of data objects persisted at the plurality of persistent systems; and send the value for storage in the one or more data fields at one or more persistent systems of the plurality of persistent systems based at least in part on the identified mapping.

15. The apparatus of claim 14, wherein the instructions are further executable by the processor to cause the apparatus to:

receive, at the computing device, an indication of an update to a persistent system of the plurality of persistent systems; and automatically update the abstraction layer based at least in part on the indication of the update to the persistent system.

16. The apparatus of claim 15, wherein the instructions to automatically update the abstraction layer are executable by the processor to cause the apparatus to:

update the mapping between the interface field and the one or more data fields, update the interface object, create a new interface object for the abstraction layer, or a combination thereof based at least in part on the update to the persistent system.

17. The apparatus of claim 15, wherein the instructions are further executable by the processor to cause the apparatus to:

send, for display at a user device, an interface for the interface object, wherein automatically updating the abstraction layer comprises refraining from modifying the interface for the interface object.

18. The apparatus of claim 14, wherein the value is received from a persistent system of the plurality of persistent systems.

19. The apparatus of claim 14, wherein the instructions are further executable by the processor to cause the apparatus to:

send, for display at a user device, the interface object, wherein the value is received from the user device.

20. A non-transitory computer-readable medium storing code for data management at a computing device, the code comprising instructions executable by a processor to:

run, at the computing device, an abstraction layer managing dependencies between a plurality of persistent systems, the abstraction layer storing definitions for a plurality of interface objects mapping to a plurality of data objects persisted at the plurality of persistent systems;

receive a value to store in an interface field of an interface object of the plurality of interface objects;

identify, at the computing device and based at least in part on the abstraction layer, a mapping between the interface field and one or more data fields for one or more data objects of the plurality of data objects persisted at the plurality of persistent systems; and send the value for storage in the one or more data fields at one or more persistent systems of the plurality of persistent systems based at least in part on the identified mapping.

\* \* \* \* \*